(12) United States Patent
Ström et al.

(10) Patent No.: US 8,577,164 B2
(45) Date of Patent: Nov. 5, 2013

(54) IMAGE PROCESSING

(75) Inventors: Jacob Ström, Stockholm (SE); Per Wennersten, Årsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 291 days.

(21) Appl. No.: 13/132,524

(22) PCT Filed: May 29, 2009

(86) PCT No.: PCT/SE2009/050632
§ 371 (c)(1),
(2), (4) Date: Jun. 2, 2011

(87) PCT Pub. No.: WO2010/082886
PCT Pub. Date: Jul. 22, 2010

(65) Prior Publication Data
US 2011/0235928 A1    Sep. 29, 2011

Related U.S. Application Data

(60) Provisional application No. 61/145,618, filed on Jan. 19, 2009.

(30) Foreign Application Priority Data

Jan. 19, 2009    (SE) ...................................... 0900053

(51) Int. Cl.
*G06K 9/36*    (2006.01)
(52) U.S. Cl.
USPC ........................................................ 382/243
(58) Field of Classification Search
USPC .................. 382/162–166, 108, 232–251; 345/501–505, 583–589, 552–555
See application file for complete search history.

(56) References Cited

U.S. PATENT DOCUMENTS

| | | | |
|---|---|---|---|
| 5,589,993 A | | 12/1996 | Naimpally |
| 5,805,735 A | * | 9/1998 | Chen et al. ..................... 382/239 |
| 5,956,431 A | | 9/1999 | Iourcha et al. |
| 6,157,743 A | * | 12/2000 | Goris et al. ..................... 382/233 |
| 6,381,371 B1 | | 4/2002 | Epstein et al. |

(Continued)

FOREIGN PATENT DOCUMENTS

WO    WO 2006/006915 A1    1/2006

OTHER PUBLICATIONS

International Search Report for PCT/SE2009/050632, mailed May 29, 2009.

(Continued)

*Primary Examiner* — Ishrat I Sherali
(74) *Attorney, Agent, or Firm* — Nixon & Vanderhye, P.C.

(57) ABSTRACT

An image (1) is decomposed into multiple superblocks (20, 22), each encompassing multiple pixel blocks (30A-30D, 32A-32D) having multiple pixels (40). The property values of a superblock (20) is fixed rate compressed to get a compressed block having a target bit length. The compressed block is stored in the memory locations (310, 320) assigned to the multiple pixel blocks (30A-30D) encompassed by the superblock (20) to thereby get multiple copies of the compressed block in the memory (300). The multiple copies collectively constitute a compressed representation of the superblock (20). When accessing a compressed block in a memory location (310) using random access during decoding, property values for neighboring pixel blocks (30B-30D) are obtained for free without the need for any further memory access.

20 Claims, 12 Drawing Sheets

(56) References Cited

U.S. PATENT DOCUMENTS

| | | | | |
|---|---|---|---|---|
| 6,452,602 | B1* | 9/2002 | Morein | 345/555 |
| 6,768,493 | B1* | 7/2004 | Donovan | 345/583 |
| 7,633,507 | B2* | 12/2009 | Akenine-Moller et al. | 345/581 |
| 7,787,691 | B2* | 8/2010 | Strom | 382/166 |
| 8,144,981 | B2* | 3/2012 | Pettersson et al. | 382/166 |
| 2011/0157192 | A1* | 6/2011 | Gong et al. | 345/505 |
| 2011/0200264 | A1* | 8/2011 | Park | 382/236 |

OTHER PUBLICATIONS

Inada, T., et al., "Compressed Lossless Texture Representation and Caching," Graphics Hardware, 2006.

Ström, J., et al., "iPACKMAN: High-Quality, Low-Complexity Texture Compression for Mobile Phones," Graphics Hardware, 2005.

Strom, J., et al., "ETC2: Texture Compression Using Invalid Combinations," Graphics Hardware, 2007.

ITU-T, H.264: Advanced Video Coding for Generic Audiovisual Services, Nov. 2007.

Van Waveren, J.M.P., et al., "Real-Time YCoCg-DXT Compression," nVidia Report, Sep. 14, 2007, available at http://developer.nvidia.com/object!real-time-ycocg-dxt-compression.html.

Suehring, JM Software H.264/Avc, http://iphone.hhi.de/suehring/html, Jan. 2009.

* cited by examiner

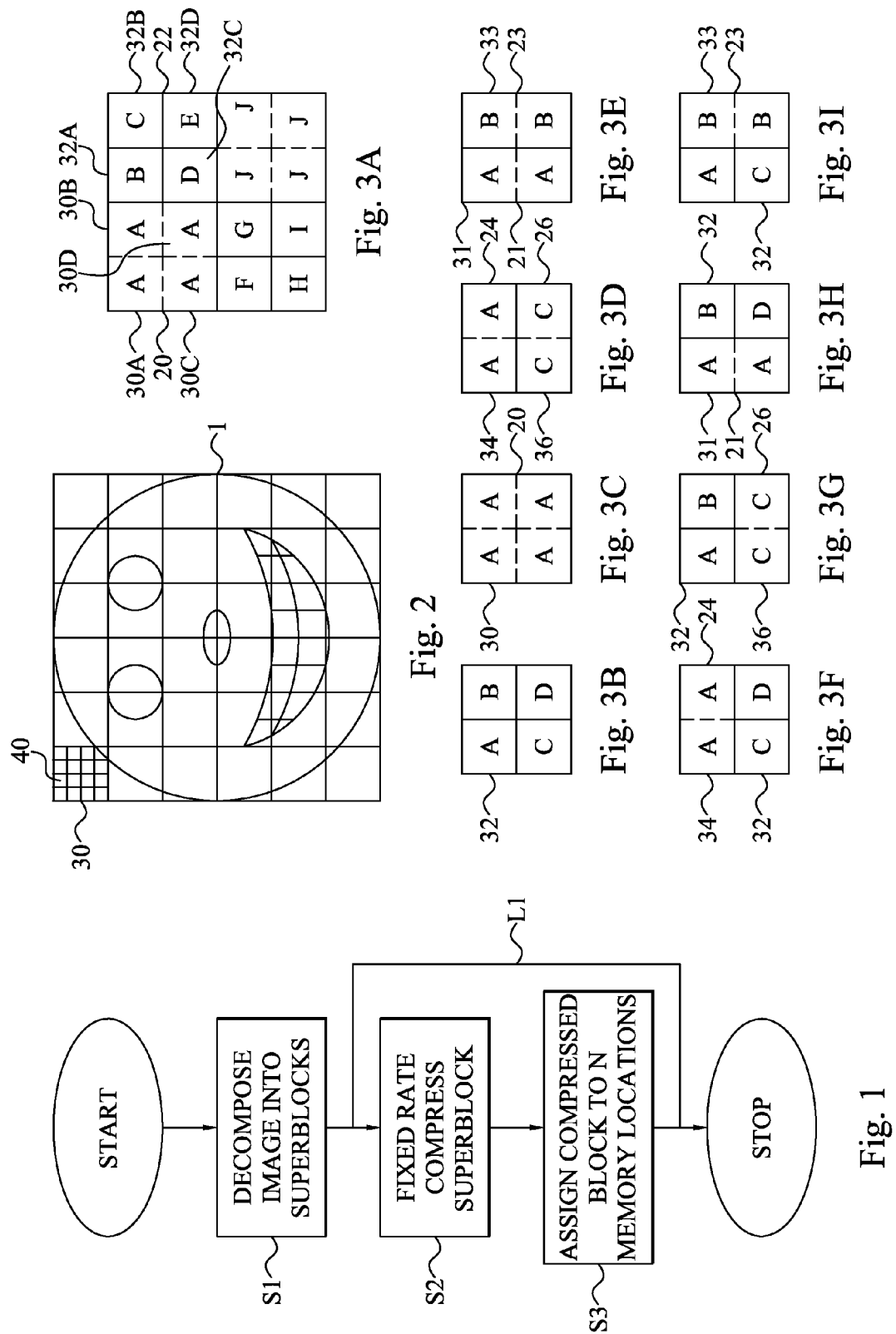

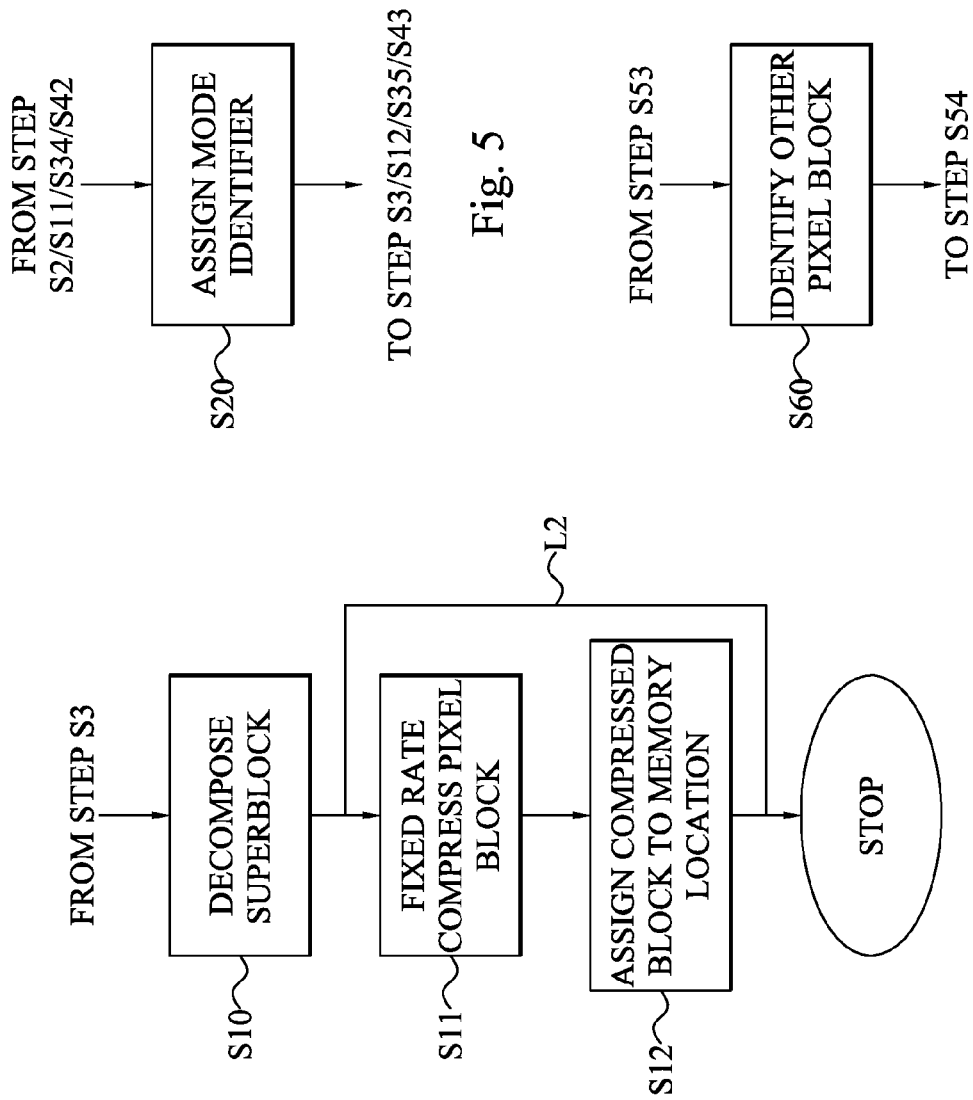

IMAGE PROCESSING

This application is the U.S. national phase of International Application No. PCT/SE2009/050632, filed 29 May 2009, which designated the U.S., and claims priority to Sweden Application No. 0900053-0, filed 19 Jan. 2009; and claims the benefit of U.S. Provisional Application No. 61/145,618, filed 19 Jan. 2009, the entire contents of each of which are hereby incorporated by reference.

TECHNICAL FIELD

The present invention generally relates to image processing, and in particular to image compression and image decoding.

BACKGROUND

When attempting to increase performance for graphics processing units (GPUs), one solution is to apply various techniques to reduce memory bandwidth consumption. Bandwidth reduction is also becoming increasingly important as the performance growth rate for processing power is much larger than performance growth rate for bandwidth and latency for random access memory (RAM).

Texture compression is one popular way of reducing bandwidth requirements. By storing textures in compressed form in memory and transferring blocks of the compressed data over the bus, the texture bandwidth is reduced substantially.

Today, the most used texture compression systems are DXTC [1] for Windows based systems and Xbox, and ETC [2] for mobile handsets. Both these systems divide an image, denoted texture, into pixel blocks of 4×4 pixels and the red, green, blue (RGB) data of the pixels is then compressed from (8+8+8)×16=384 bits down to 64 bits. Thus, each pixel block is given the same number of bits. This is important since the rasterizer used in the decompression may need to access any part of the texture and needs to easily be able to calculate the memory address of the desired pixel block. In other words, a fixed rate codec, i.e. a codec where every pixel block takes up the same amount of storage space, is very desirable and is the norm among texture compression algorithms today.

However, the fixed compression rate comes at a great cost. In most textures, some parts thereof usually contain a lot more information than other parts of the texture. If a fixed rate must be used for every pixel block, either too many bits will be spent in the easy areas, which therefore will be of unnecessary good quality, or too few bits will be spent in the hard-to-code areas, giving unsatisfactory quality to those parts.

The solution to this problem of fixed rate codecs is to use so-called variable length coding (VLC). In VLC easy-to-code pixel blocks are given few bits and hard-to-code pixel blocks are given more bits. However, this improvement in pixel block compression comes at the cost of not achieving an easy calculation of the memory address of a particular pixel block.

Inada and McCool [3] have presented a solution that uses a look-up-table (LUT) for indicating where each VLC-coded pixel block is located in the memory. Usage of LUTs, though, introduces new problems in the form of caching. Before the decoding system can start requesting the desired pixel block from memory it first must use a LUT in this case. However, the LUT is rather big and cannot be kept on chip. Hence, the decoding system must first request the relevant part of the LUT and not until it receives this information from the memory does it know from where to request the relevant bits of the pixel block. This is called memory indirection and is a major complication. It adds to latency, which is one of the major problems of modern graphical processing units (GPUs).

SUMMARY

The present embodiments overcome these and other drawbacks of the prior art arrangements.

It is a general objective to provide an efficient image processing.

This and other objectives are met by the embodiments as defined by the accompanying patent claims.

Briefly, the present embodiments involve compressing an image or texel by decomposing it into multiple superblocks. A superblock encompasses N multiple pixel blocks or texel blocks, each having a defined number of pixels or texels. Furthermore, each pixel has an associated property value.

A superblock is compressed by fixed rate compressing property values of the superblock to get a compressed block having a target bit length. The compressed block is assigned to and stored in memory locations assigned for the N pixel blocks encompassed by the superblock. This means that N copies of the same compressed block is present in the memory for the superblock. These N copies of the compressed block collectively constitute a compressed representation of the superblock.

During decoding the memory address is determined for a pixel block comprising a pixel, the property value of which should be decoded. The fixed rate compression guarantees that each memory location of the pixel blocks comprises the same amount of data, thereby achieving random access. The compressed block having the target bit length and being stored in the memory location assigned to the pixel block is fetched and transferred from the memory over a bus to a cache. The compressed block is then decompressed to get multiple property values. However, as the pixel block constitutes a part of a superblock and therefore was co-compressed together with at least one neighboring pixel block, not only at least one property value of the pixel block but also of the at least one neighboring pixel block are obtained from the single memory access.

In an embodiment, an image compressor is provided for compressing an image comprising multiple pixels. The image compressor comprises an image decomposer for decomposing the image into multiple superblocks. Such a superblock encompasses, as previously was mentioned, N pixel blocks of multiple pixels. A fixed rate compressor is arranged in the image compressor for fixed rate compressing property values of a superblock to get a compressed block having a target bit length. This compressed block is assigned by a memory assigner to N memory locations of a memory. These N memory locations are assigned for the N pixel blocks encompassed by the superblock. Consequently, N copies of the compressed block are present in the memory locations and together constitute a compressed representation of the superblock.

Another aspect relates to an image decoder for decoding an image. This image decoder comprises a memory accessor, fetcher or processor for fetching a compressed block from a memory storing multiple compressed blocks representing the image (5). The fetched compressed block is processed by a decompressor that decompresses the compressed block to get multiple property values. These multiple property values are assigned by a value assigner to not only a first pixel block but also at least one second pixel block. This first and at least one pixel block are encompassed together in a same superblock of the image. A pixel decoder then at least partly decodes the image based on at least one property value of the first pixel block and at least one property value of the at least second pixel block.

Embodiments as disclosed herein provide a major advantage over the prior art since during image decoding often multiple pixels or texels are needed in order to draw a single pixel on the image. This means that the chance of having all desired property values in the cache without having to fetch them by time-consuming memory accesses significantly increases with the embodiments. Thus, accessing and fetching a compressed block relating to a given pixel block also gives for free compressed data that can be applied to a neighboring pixel block in the image without the need for a further memory access.

Other advantages offered will be appreciated upon reading of the below description of the embodiments of the invention.

BRIEF DESCRIPTION OF THE DRAWINGS

The embodiments together with further objects and advantages thereof, may best be understood by making reference to the following description taken together with the accompanying drawings, in which:

FIG. 1 is a flow diagram illustrating a method of compressing an image according to an embodiment;

FIG. 2 is a schematic illustration of an image to be compressed according to an embodiment;

FIGS. 3A to 3I schematically illustrate decomposition of a portion of an image into superblocks and pixel blocks;

FIG. 4 is a flow diagram illustrating an additional step of the compressing method according to an embodiment;

FIG. 5 is a flow diagram illustrating additional steps of the compressing method according to an embodiment;

FIG. 9 is a flow diagram illustrating an additional step of the decoding method according to an embodiment;

FIG. 10 is a flow diagram illustrating additional steps of the decoding method according to an embodiment;

DETAILED DESCRIPTION

Figure 6:
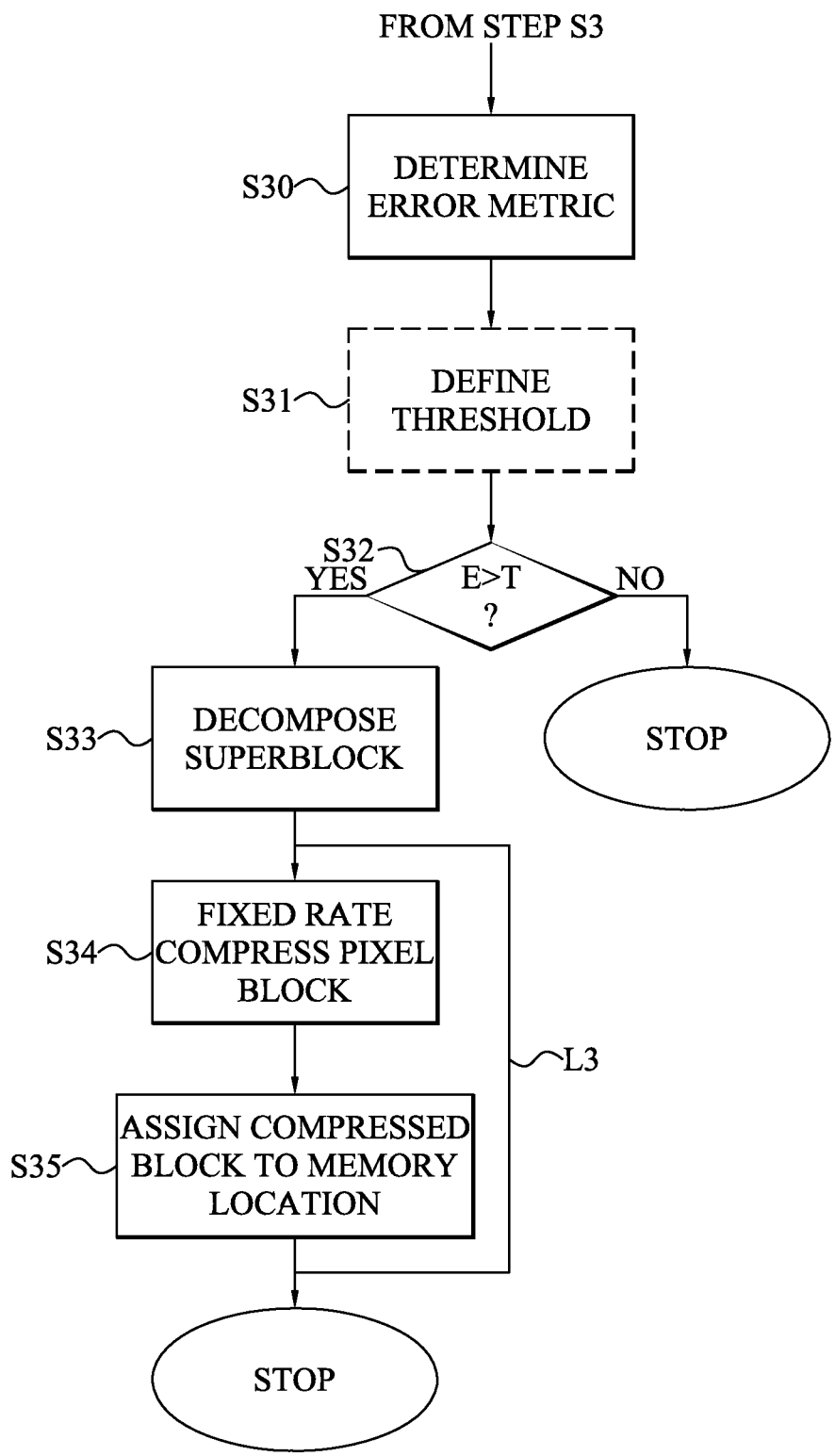
FIG. 6 is a flow diagram illustrating additional steps of the compressing method according to an embodiment.

Throughout the drawings, the same reference characters will be used for corresponding or similar elements.

The present invention generally relates to compression and decompression, or sometimes denoted encoding and decoding, of pixel property values, and in particular such a compression and decompression suitable for texture compression and decompression.

The present embodiments are well adapted for usage with three-dimensional (3D) graphics, such as games, 3D maps and scenes, 3D messages, e.g. animated messages, screen savers, man-machine interfaces (MMIs), etc., but is not limited thereto. Thus, the embodiments could also be employed for encoding other types of images or graphics, e.g. one-dimensional (1D), two-dimensional (2D) or 3D images.

Furthermore, in the following, the term "image" is used to denote any 1D, 2D or 3D image or texture that can be encoded and decoded by means of the present embodiments, including but not limited to bump maps, normal maps, photos, game type textures, text, drawings, high dynamic range images and textures, etc.

An image is composed of multiple, i.e. at least two, so-called image elements, generally denoted pixels for picture elements, texels for texture element or voxels for volume elements in the art. In the following, the expression pixel is consistently used for denoting such an image element. However, the expression pixel is regarded herein as encompassing texels and voxels, for instances when the processed image is in the form of a texture or a 3D image.

Generally, a pixel is characterized by an associated pixel parameter, or pixel property value or feature. There are different such characteristic property values that can be assigned to pixels in the art. For instance, the property value could be a color value assigned to the pixel. As is well known in the art, different color spaces are available and can be used for representing pixel color values. A usual such color space is the so-called red, green, blue (RGB) color space. A property value could therefore be an RGB color, i.e. the consisting of three color components.

A pixel color can also be expressed in the form of luminance and chrominance components. In such a case, a transform can be used for converting a RGB color value into a luminance value and, typically, two chrominance components or converting the luminance and chrominance values into a RGB color value. Examples of luminance-chrominance spaces in the art include YUV, $YC_oC_g$ and $YC_rC_b$. A property value can therefore also be such a luminance value (Y) and associated chrominance values (U, V, $C_o$, $C_g$, $C_r$ or $C_b$).

Other pixel property values include depth values for a depth map, alpha (A) values, often used for carrying transparency data and can be used in connection with a color value, such as RGBA.

The present embodiments provide a novel approach to image and texture processing by achieving random access and allowing easy calculation of the memory address of pixel blocks but still achieve a reduction in bandwidth consumption.

Compression

FIG. 1 is a flow diagram illustrating a method of compressing an image, such as a texture, according to an embodiment.

The image comprises multiple pixels, where each pixel has a respective property value, for instance a RGB888 value. The compression generally starts in step S1, where the image is decomposed or regarded as being decomposed into so-called superblocks.

In the art of image compression a plurality of pixels, typically in the form of a pixel block or a tile, are collectively handled. In a preferred embodiment, such a pixel block has the size of $M_1 \times M_2$ pixels, where $M_1$, $M_2$ are integer numbers with the proviso that both $M_1$ and $M_2$ are not simultaneously one. Preferably, $M_1 = 2^k$ and $M_2 = 2^l$, where k, l are zero or integers with the proviso that k and l are not simultaneously zero. In a typical implementation $M_1 = M_2$ and preferred such pixel block embodiments could be 4×4 pixels or 8×8 pixels. The prior art "standard" compression schemes, DXTC and ETC, use pixel blocks of 4×4 pixels. FIG. 2 illustrates this concept, in which an image, such as a texture 1, is divided into multiple pixel blocks 30, where each pixel block 30 comprises multiple pixels 40. In the figure the pixels 40 of only one of the pixel blocks 30 have been explicitly indicated in order to simplify the figure.

A superblock as defined in step S1 encompasses N such pixel blocks of multiple pixels, where N is an integer equal to or larger than two. Thus, if a pixel block comprises 4×4 pixels, a superblock could be 8×8 pixel with N=4 or 4×8 or 8×4 pixels with N=2. In a further embodiment, a superblock of 16×16 pixels with N=16 or 16×8 or 8×16 pixels with N=8 could also be available. Correspondingly, if a pixel block has a size of 8×8 pixels, a superblock could be 16×16 pixels, typically denoted macroblock in the art, with N=4 or 8×16 or 16×8 pixels with N=2. Also superblocks comprising an odd number of pixel blocks are possible and within the scope of the invention. In such a case, non-quadratic and non-rectangular superblock shapes can be used, such as L or T shaped superblocks. An image processed according to the embodiments may comprise multiple superblocks of a same size in terms of the number of pixel blocks occupied by the area of the superblock in the image. However, the embodiments are not necessarily limited thereto as is further illustrated herein. In clear contrast, a first superblock could have a first size, such as 16×16 pixels, while a second superblock has a second size, such as 16×8 pixels with perhaps a third superblock with a third size, such as 8×16 pixels. The common feature of these superblocks is that they all encompass an area of an image that is occupied by at least two pixel blocks, where each pixel block comprises multiple pixels having respective property values. However, though the superblocks as defined herein may have varying sizes, the size of the pixel block as defined herein is preferably fixed and the same throughout the whole image, e.g. being 4×4 pixels or 8×8 pixels for all pixel blocks.

A next step S2 fixed rate compresses the property values of a superblock defined in step S1 to get a compressed block. Fixed rate compressing implies that the size or bit length of the resulting compressed block is fixed and equal to a specified target bit length. Thus, all the compressed blocks output from a fixed rate compressor will have the same target bit length. This means that the output length will be equal to the target bit length regardless of whether the superblock had a size of, for instance, 16×16 pixels, 16×8 pixels or 8×16 pixels.

The size of the compressed block is, though, of course smaller than the size of the uncompressed version of the superblock. For instance, if each pixel has a RGB888 property values and, thus, requires 24 bits, a 16×16 superblock has a size in uncompressed version of 256×24=6 144 bits. The target bit length could then be 256 bits as an illustrative example.

The compressed block determined in step S2 is assigned in step S3 to memory locations assigned for the N pixel blocks encompassed by the superblock. This means that the same bit sequence representing the compressed block will be present in the N different memory locations assigned for the N pixel blocks. The N copies of the same compressed block and the N copies of the same bit sequence in the memory locations collectively constitute a compressed representation of the superblock.

The fixed rate compression of a superblock in step S2 and the assignment of the resulting compressed block to multiple different memory locations in step S3 can be repeated for other superblocks in the image, which is schematically illustrated by the line L1 in FIG. 1. Note that for these different superblocks the value of N may be the same or indeed different.

Multiple superblocks may be processed sequentially, i.e. basically repeating steps S2 and S3 sequentially for each such superblock. Alternatively, multiple superblocks may be processed according to steps S2 and S3 in parallel also indicated by the line L1.

FIG. 4 illustrates further steps of the image compressing method. These additional steps are used in the case the image, as is further discussed herein, cannot solely be compressed by handling superblocks. For instance, in areas of the image with a lot of information and details, a superblock is further decomposed into its N pixel blocks and each such pixel block is compressed separately. This is illustrated in FIG. 4. Thus, a first step S10 decomposes a superblock into the N pixel blocks, such as two or four pixel blocks depending on the size of the superblock. Each such pixel block is then processed sequentially or in parallel according to the procedures of steps S11 and S12, which is schematically illustrated by the line L2.

Step S11 fixed rate compresses the property values of the pixel block to get a compressed block having the target bit length. Thus, the same bit length of the compressed block resulting from compressing a pixel block is achieved in step S11 as when compressing a superblock in step S2 even though the superblock occupies a larger area of the image than the pixel block. This novel feature of the embodiments achieves random access of compressed blocks.

Step S12 assigns the compressed block to a memory location in the memory assigned to the current pixel block. As the superblock comprises N pixel blocks, steps S11 and S12 are performed N times. This means that in most cases, unless the compressed blocks obtained in the different runs of step S11 generates the same compressed block, the memory will contain N different compressed blocks. The N compressed blocks in the memory locations collectively constitute the compressed representation of the superblock.

Note that in step S3 of FIG. 1 the same compressed block is provided in each of the N memory locations. However, in step S12 each individually determined compressed block occupies one of the N memory locations.

FIG. 3A illustrates this concept by showing a portion of an image with marked pixel blocks 30A, 30B, 30C, 30D, 32A, 32B, 32C, 32D. In the figure, the letters A to J denote the compressed block obtained by fixed rate compressing a superblock according to step S2 of FIG. 1 or fixed rate compressing a pixel block according to step S11 of FIG. 4. These compressed blocks A to J all have the same size in terms of bit length.

The four pixel blocks 30A, 30B, 30C, 30D occupying the upper left corner together constitute a superblock 20. This superblock 20 is compressed according to the procedure in step S2 of FIG. 1 to get the compressed block A. The code of this compressed block A is assigned the memory location of each of the four pixel blocks 30A, 30B, 30C, 30D. This is schematically illustrated by assigning A to all of these pixel blocks 30A, 30B, 30C, 30D in the figure.

The next superblock 22 in the image, however, is not compressed according to FIG. 1 as the previous superblock 20. In clear contrast, the superblock 22 is decomposed into its pixel blocks 32A, 32B, 32C, 32D and each of these pixel blocks 32A, 32B, 32C, 32D is individually compressed to get separate compressed blocks B to E.

Random access is achieved as the total number of bits of the compressed representation of the first superblock 20, i.e. 4 times the bit length of A, is the same as for the compressed representation of the second superblock 22, i.e. bit length of B+C+D+E. This means that if a pixel block number r in pixel block order, i.e. traveling row-by-row starting from the upper left corner, is to be accessed in the memory, its location can easily be identified as occupying the pixels from (r−1)×Size to r×Size−1, where Size denotes the bit length of the compressed blocks A to J. Correspondingly, if x and y are the coordinates of a desired pixel in the image, then floor(x/8) and floor(y/8) give the coordinates of the pixel block comprising the pixel in the case of a pixel block size of 8×8 pixels. The memory byte address of the desired compressed block is therefore (floor(y/8)×(width/8)+floor(x/8))×256/8 if width is the width of the image in pixels and the compressed block has a bit length of 256 bits. Thus, the embodiments allow random access.

FIGS. 3B to 3I illustrate different possibilities in which a macroblock can be decomposed into a superblock, multiple superblocks, a superblock and multiple pixel blocks or multiple pixel blocks. FIG. 3B illustrates the case, where each pixel block 32 is handled separately generating four, typically different, compressed blocks A to D, each having the same target bit length.

FIG. 3C illustrates the case where a superblock 20 encompasses four pixel blocks 30 and a single compressed block A is determined for all the pixel blocks. This compressed block A is though repeated in the memory locations assigned to the four pixel blocks 30, thereby storing four version thereof.

In FIG. 3D, the macroblock is divided into two superblocks 24, 26, each encompassing the area of two pixel blocks 34, 36 respectively. A first compressed block A is determined for the first superblock 24 and is assigned to both the memory locations of the two included pixel blocks 34. Correspondingly, a second compressed block C is determined for the other superblock 26 and is assigned to the two pixel blocks 36 encompassed by this superblock 26.

FIG. 3E is similar to FIG. 3D but the two superblocks 21, 23 encompasses pixel blocks 31, 33 of two different rows instead of two different columns. The compressed block A determined for the first superblock 21 is assigned to both the pixel blocks 31 encompassed by the superblock 21 and the same for the other compressed block B and the second superblock 23 and its pixel blocks 33.

The two upper pixel blocks 34 in FIG. 3F are collectively handled as a superblock 24 and therefore are assigned the same compressed block A. The two lower pixel blocks 32 are fixed rate compressed separately generating two different compressed blocks C, D.

FIG. 3G is very similar to FIG. 3F but where the upper pixel blocks 32 are compressed separately into compressed blocks A, B and the two lower pixel blocks 36 are compressed together as a superblock 26 to get a compressed block C assigned to the memory locations of both the pixel blocks 36.

FIGS. 3H and 3I illustrate a similar concept as FIGS. 3F and 3G but where the superblocks 21, 23 occupies pixel blocks 31, 33 of different rows. The respective other two pixel blocks 32 are fixed rate compressed separately.

A given image can have all its macroblock areas defined according to any of the FIGS. 3B to 3I. However, in most practical applications some portions of the image will be as defined in one of FIGS. 3B to 3I while at least one other portion of the image will be as defined in at least one other of FIGS. 3B to 3I. The image can therefore sometime be a patchwork of different image portions that are compressed as superblocks and pixel blocks.

Generally, the embodiment illustrated in FIG. 3C is typically present for fairly homogenous image portions with few details, whereas FIG. 3B with individual pixel blocks is present in highly detailed areas of the image. The other embodiments of FIGS. 3D to 3I are present for other image portions that cannot efficiently be compressed as a whole large superblock but are instead preferably decomposed into smaller sized superblocks as in FIGS. 3D and 3E or a smaller sized superblock and individual pixel blocks as in FIGS. 3F to 3I.

FIG. 6 is a flow diagram illustrating additional steps of an embodiment of the image compressing method. The method continues from step S3 of FIG. 1. A next step S30 determines an error metric E indicative of how well the N copies of the compressed block determined in step S2 of FIG. 1 represents the property values in the image area of the superblock.

The error metric is typically obtained by decompressing the compressed block to get representations of the original property values for the pixels in the superblock. The squared difference between these representations and the original property values can then be calculated and summed, thus giving the summed square error (SSD) for the superblock. Other error metrics known in the art and preferably used within the field of image and texture compression can alternatively be used instead of SSD.

A next optional step S31 defines a maximum error threshold. This step S31 is typically used when a user or operator is allowed to determine a target quality for the image compression. For instance, this target quality could be that X % of the image is to be handled in the form of superblocks while for the remaining 100−X % thereof the pixel blocks are fixed rate compressed individually. In such a case, the whole image is preferably first decomposed into superblocks and compressed as previously described in FIG. 1. A respective error metric is determined for each superblock. The X % of the superblocks that have the highest quality, i.e. lowest error metric, are then identified. The maximum error threshold T is then defined as being equal to the highest error metric of these lowest error metrics.

Alternatively step S31 is skipped and the maximum error threshold is a predefined error value that is regarded as the largest acceptable error for a superblock.

A next step S32 compares the error metric determined for a superblock in step S30 with the maximum error threshold. If the error metric does not exceed the maximum error threshold, the property values of the superblock can with adequate quality be represented by the N copies of the compressed block determined in step S2 of FIG. 1.

However, if the error metric exceeds the maximum error threshold in step S32, the method continues to step S33. This step S33 decomposes the superblock into the N pixel blocks. This step S33 is performed similar to step S10 of FIG. 4 and is not further discussed herein. Each of the N pixel blocks is then processed individually in steps S34 and S35, which is schematically illustrated by the line L3, where the processing can be conducted in parallel or sequentially for the N pixel blocks. Step S34 basically corresponds to step S11 of FIG. 4 and fixed rate compresses property values of a pixel block to get a compressed block having the target bit length. Step S35 corresponds to step S12 of FIG. 4 and involves entering the bit sequence of this compressed block in the memory location assigned to the pixel block.

In this case, the property values of the superblock could not be represented at adequate quality by the N copies of the compressed block determined in step S2 of FIG. 1. In clear contrast, the superblock had to be decomposed into N pixel blocks that are compressed individually to get N different compressed blocks.

Figure 7:
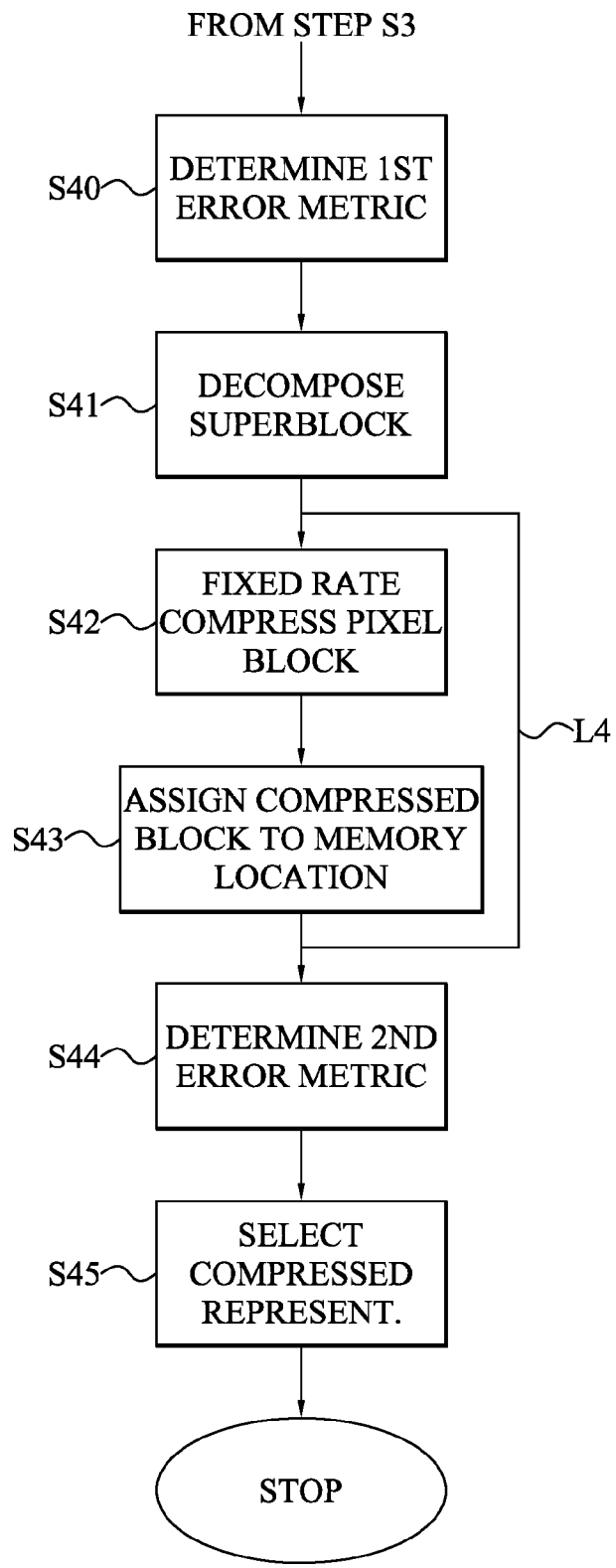
FIG. 7 is a flow diagram illustrating a method of decoding an image according to an embodiment.

An alternative procedure that allows handling different image portions differently, i.e. in the form of a superblock, multiple superblocks, a superblock and multiple pixel blocks or multiple pixel blocks is illustrated in FIG. 7.

The method continues from step S3 of FIG. 1. A next step S40 determines a first error metric indicative of representing the property values of the superblock with the N copies of the compressed block determined in step S2 of FIG. 1. The error metric can be the same type of error metric as was determined in step S30 of FIG. 7. In an alternative approach, the error metric is a so-called rate distortion value defined as rd=rate+ $\lambda \times$ distortion, where rate denotes the number of bits needed for compressing property values per image portion occupying $2 \times 2$ pixel blocks, see FIGS. 3B to 3I, without counting any repeated compressed block. This means that the rate in FIG. 3B is 4×Size, Size in FIG. 3C, 2×Size in FIGS. 3D and 3E and 3×Size for FIGS. 3F to 3I. distortion is the summed square between the representation of the property values obtained by decompressing the compressed block and the original property values for the pixels, with distortion=$\Sigma_{x,y}(\hat{r}_{xy}-r_{xy})^2+(\hat{g}_{xy}-g_{xy})^2+(\hat{b}_{xy}-b_{xy})^2$ and $\hat{r}_{xy}$ and $r_{xy}$ being the red component of the compressed pixel block and the original pixel block, respectively, ditto for the green and blue components. $\lambda$ is a weight factor that is used to achieve a desired contribution of the distortion to the rate distortion measure. By varying $\lambda$ different qualities and thereby different bit rates are achieved for the image.

A next step S41 decomposes the superblock into N pixel blocks as previously described in connection with FIGS. 4 and 6. These N pixel blocks are individually fixed rate compressed into N compressed pixel blocks in step S42. The compressed pixel blocks are assigned to the respective memory locations assigned for the pixel blocks in the memory in step S43. The line L4 denotes that steps S42 and S43 are performed sequentially or in parallel for each of the N pixel blocks.

A corresponding second error metric indicative of how well the N compressed pixel blocks is determined in step S44 represent the property values with. The compressed representation, i.e. the N copies of the compressed block from step S2 of FIG. 1 or the N compressed blocks from step S42, to use for the pixels is selected in step S45 based on the first and second error metrics, preferably the two rate-distortion values. Preferably, the compressed representation resulting in the lowest rate-distortion value is selected and used for the macroblock area.

In a typical implementation, each 2×2 pixel block area of the image is tested according to any of the eight possible variants illustrated in FIGS. 3B to 3I. This means that each such pixel block area is compressed 8 times and 8 rate-distortion values are determined for the area. The combination of superblocks and pixel blocks resulting in the lowest rate-distortion value for the image is then selected and the compressed blocks of these superblocks and pixel blocks are used as compressed or encoded representation of the image.

FIG. 5 is a flow diagram illustrating an additional step involving assignment of mode identifier in connection with the fixed rate compression in FIGS. 1, 4, 6 and 7. A compressed block is assigned a mode identifier in step S20 that has different values depending on whether the compressed block is determined for a superblock or for a pixel block. Thus, if a group of 2×2 pixel blocks can either be compressed together as a superblock to get one compressed block, which is then copied to get four versions thereof, one for each pixel block, the mode identifier has first value. However, if the 2×2 pixel blocks are instead compressed individually to get four compressed blocks, each of these four compressed blocks comprises a mode identifier having a second value that is different from the first value.

Correspondingly, if there are eight possibilities for a group of 2×2 pixel blocks as is illustrated in FIGS. 3B to 3I, the mode identifier needs to have four different values, three for the superblock types and one for the pixel block, which is achieved by a 2-bit mode identifier.

The mode identifier is preferably regarded as being included in the compressed block as the bit sequence of the compressed block and the mode identifier should together be equal to the target bit length.

This mode identifier is used, during decoding, in order to determine, once the compressed block corresponding to a pixel block is read from the memory, whether decompressing the compressed block also gives property values for at least one neighboring pixel block for free. This happens if the pixel block formed, during compression, is part of a superblock, where its original property values and also original property values of at least one other pixel block are collectively processed to determine the compressed block. This a major advantage of the present embodiments, i.e. that reading the bit sequence of a single pixel block from the memory automatically gives, when decompressing the bit sequence, property values of not only the intended pixel block but also of neighboring pixel block or blocks. The number of memory accesses that are required is reduced if property values of the neighboring pixel block or blocks are also needed during the decoding and these can be read from the cache instead of in the memory. The embodiments therefore reduce the memory bandwidth and the amount of data that has to be transferred from the memory to the GPU cache.

In the foregoing, the embodiments have been discussed in connection with usage of fixed rate compression applicable to the property values of a superblock or the property values of a pixel block. The embodiments can actually use any type of fixed rate compression algorithm in the art that produces a compressed block having the pre-defined target bit length. The same type of compression algorithm can be used for handling larger superblocks as when compressing smaller pixel blocks. Alternatively, a first fixed rate compression algorithm is applicable for compressing a superblock, while a second fixed rate compression algorithm is used for the pixel blocks. However, in such a case both compression algorithms should produce compressed blocks having the same target bit length even though the first compression algorithm has more property values as input as compared to the second compression algorithm. This concept may of course be extended to the case where superblocks can be of different sizes, such as 16×16 pixels versus 8×16 or 16×8 pixels. In such a case, up to three or four different fixed rate compression algorithms can be used, one for 16×16 superblocks, one for 8×8 pixel blocks, one for 8×16 and 16×8 superblocks or one for 8×16 superblocks and one for 16×8 superblocks.

Herein some illustrative examples of suitable fixed rate compression algorithms that can be used in the embodiments are listed. The embodiments are though not limited thereto but can use other types of fixed rate compression algorithms meeting the above described requirements.

The compression algorithm ETC2 [2, 4, 5], the teachings of which are hereby incorporated by reference, can be used for encoding a 4×4 pixel block to produce a 64-bit compressed block. This compression algorithm can also be used for handling an 8×8, 8×4 or 4×8 superblock. In such a case, pixels are first subsampled into 4×4 pixels and then compressed as usual with ETC2. Thus, in an 8×8 superblock, a single property value is calculated for each non-overlapping 2×2 pixel group in the superblock, preferably as an average of the four property values. The 64 property values are therefore reduced down to 16 property values that are input to the ETC2 compressor to get a 64-bit compressed block. During decompression, each of the decompressed representations of property values obtained from the compressed block are assigned to a respective 2×2 pixel group. For the smaller superblocks subsampling is only needed in one dimension, i.e. determining a single property value for each non-overlapping 2×1 or 1×2 pixel group.

In ETC2 [2, 4, 5] a flip bit is used in the compressed block in order to signal which of two different pixel block layouts that are used. This flip bit can instead be used as a mode identifier as identified herein to determine whether the compressed block origins from a pixel block compressed individually or from a superblock comprising multiple pixel blocks.

If a 2-bit mode identifier is required, one of the bits can be the above-described flip bit. The other bit can be obtained by, for instance, reducing the number of bits dedicated for the blue component in a color codeword.

Another possibility can use DXTC [1], which is adapted for compressing a 4×4 pixel block into 64 bits. DXTC generates a compressed block comprising, among others, two color codewords. However, a compressed block with the first color codeword being equal to a first value and the second color codeword being equal to a second value can generate, during decompression, the same decompressed property values as a compressed block with the first color codeword being equal to the second value and the second color codeword being equal to the first value. As a consequence, the DXTC compressor can therefore be forced so that the value of the first color codeword is always smaller than the value of the second color codeword and still be able to handle all the input pixel blocks. This ordering trick can be used for signaling whether the compressed block originates from a pixel block or superblock. Thus, if the first color codeword is being smaller than the second color codeword, the compressed block originates from a pixel block. However, if the first color codeword instead is larger than the second color codeword, the compressed block originates from a superblock. This means that in this case the mode identifier comprises the color codewords. Discussion of obtaining two different modes using the ordering of color codewords is extensively discussed in [5], the teaching of which is hereby incorporated by reference.

A 4×4 pixel block is, thus, compressed as in DXTC but forcing the first color codeword to be smaller than the second color codeword. An 8×8 superblock is first subsampled as described above to get 4×4 property values. These are compressed as in DXTC but forcing the first color codeword to be larger than the second color codeword.

It is also possible to use DXTC for the case with three different superblock sizes, such as 8×8, 8×4 and 4×8 pixels. In such a case, the, for instance, first two pixels are forced to have same most significant bit in the pixel index used for identifying one of the four color representations that are determined as different linear combinations of two base colors represented by the two color codewords, see document [1], the teaching of which is hereby incorporated by reference. Thus, one bit is saved from this approach. This bit is then used together with the ordering trick discussed above to signal whether the compressed block originates from a 4×4 pixel block, an 8×8 superblock, an 8×4 superblock or a 4×8 superblock. Subsampling in the x-direction (over columns) and/or in the y-direction (over rows) are first used for the superblocks as discussed in the foregoing.

Alternatively, no restrictions on the values of the first and second color codewords are used in order to signal mode identifiers. In clear contrast, extra bits can be taken from one of the color components in the codeword. For instance, by instead using RGB555, i.e. spending 5 bits per color component in the codewords, instead of RGB565, two bits become available for usage as mode identifier.

In a further embodiment, a pixel block has 8×8 pixels, with superblocks of size 16×16, 16×8 or 8×16 pixels. No subsampling is required for the superblocks but each block is instead compressed as an intra frame in H.264 [6]. Document [6] is hereby incorporated by reference. The header information and other meta data traditionally used in intra frames are omitted in this embodiment. The pixel block or superblock is instead compressed by trying different quantization parameters (qp) until the smallest quantization that still results in a bit length equal to or less than 248 bits is found. If the bit length falls short of 248 bits, dummy bits, such as a series of $0_{bin}$ or $1_{bin}$ can be attached, e.g. to the end of the bit sequence in order to reach 248 bits The compressed block comprises a 2-bit mode identifier representing any of the above listed four pixel groups, the identified qp value in 6 bits and finally the compressed property values having a up to 248 bits. Thus, a total size of the compressed becomes 256 bits regardless of whether it originates from an 8×8 pixel block or a 16×16, 16×8 or 8×16 superblock.

Today, in H.264 [6] the smallest allowed image size is 16×16 pixels. However, this is easily solved by stopping the operation of the compressor once it has reached the target size of the pixel block or superblock.

Decoding

Figure 8:
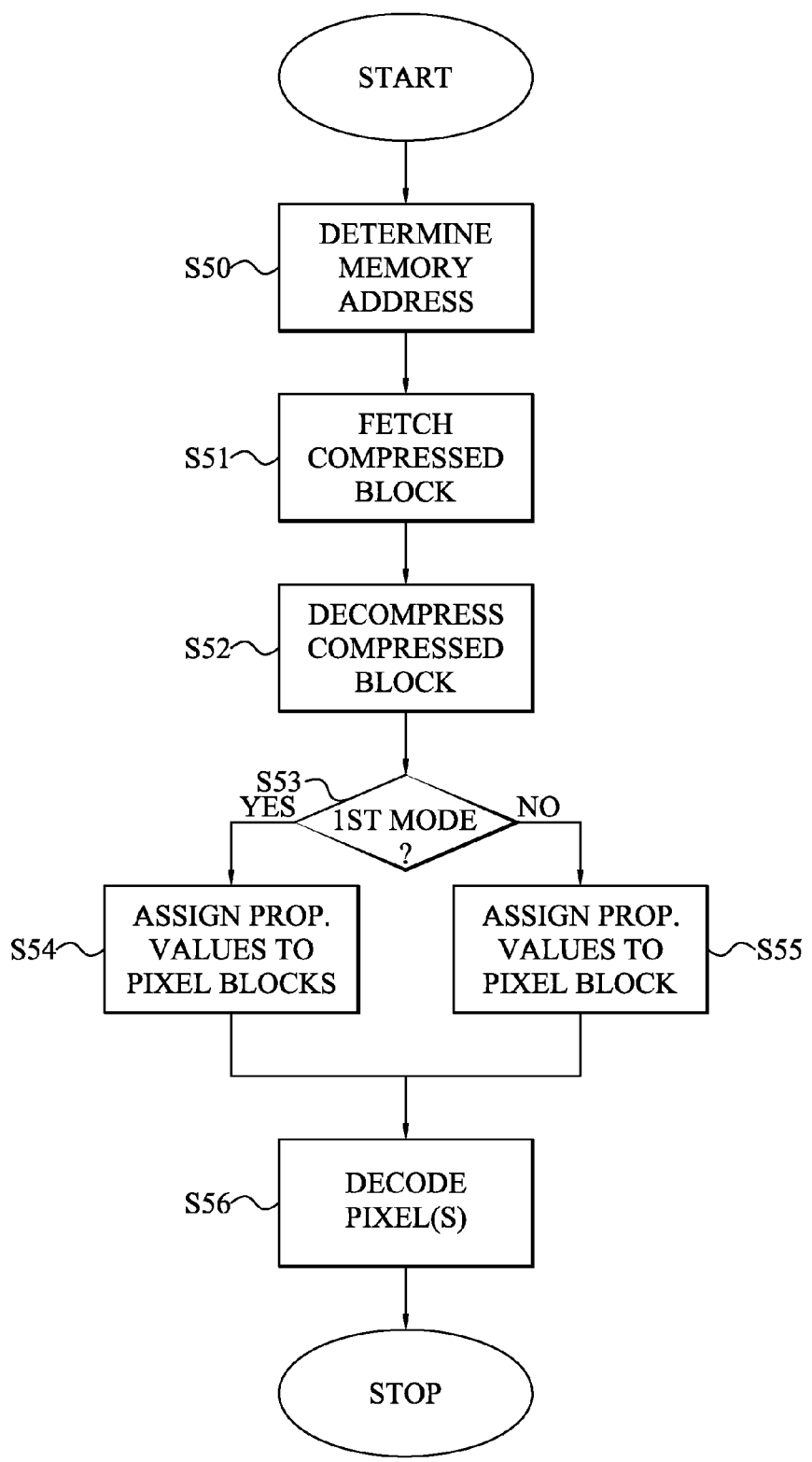
FIG. 8 is a flow diagram illustrating an additional step of the decoding method according to an embodiment.

FIG. 8 is a flow diagram illustrating a method of decoding an image represented by multiple compressed blocks stored in a memory. The method generally starts in step S50 where the memory address of a desired compressed block having at least one property value that is needed in order to generate a property value of a pixel in the image is determined. The compression embodiments generate compressed blocks having a same target bit length and therefore random access to any of the compressed block is easily performed by first calculating the memory address of the compressed block. The byte address of a compressed block is simply (floor(y/8)× width/8+floor(x/8)))×Size/8, if a pixel block comprises 8×8 pixels or (floor(y/4×width/4+floor(x/4)))×Size/8 if a pixel block comprises 4×4 pixels.

Thus, first the coordinates (x, y) pixel having a property value that should be decoded is input in the formula above together with the width width of the image and the target bit length Size to get the memory location of the compressed block originating from a pixel block or superblock comprising the desired pixel.

The Size bits of the compressed block are fetched from the random-access memory (RAM) in step S51 and are transferred over the memory bus from the RAM to a cache in which the compressed block is temporarily stored during the decoding. The compressed block is decompressed in step S52 to get multiple property values that are used as representations of the original property values of the pixel block or superblock. The compressed block also preferably comprises a mode identifier as discussed in the foregoing. This mode identifier basically defines whether the compressed block originates from a pixel block or a superblock and optionally the size and optionally the shape of the superblock. The value of the mode identifier is therefore preferably investigated in step S53.

If the mode identifier has a first value indicating a superblock the multiple property values determined in step S52 during the decompression are assigned to the pixels of the pixel block comprising the target pixel and to the pixels of at least one other pixel block. The pixel block and the at least one other pixel block are together encompassed in a superblock. This means that even though the memory access and compressed block fetching of step S51 had the intention of retrieving a compressed block to determine property values of a portion of the image or texture corresponding to a pixel block, property values for at least one neighboring portion of the image or texture is obtained for free, i.e. without any further memory access. For instance, it was expected to get 64 property values with the single memory access and compressed block decompression for an 8×8 pixel block. However, in an illustrative example 256 or 128 property values are instead obtained as the compressed block originated from a 16×16 superblock or a 16×8/8×16 superblock. The cache therefore now comprises decompressed property values of not only the pixel block comprising the target pixel but also original property values of at least one neighboring pixel block in the image.

At least one pixel of the image is decoded in step S56 based on the now provided property values present in the cache. This decoding preferably involves using at least two decompressed property values from step S52 to calculate a single property value of the image. For instance, in bilinear interpolation a chunk of 2×2 property values is used for determining a property value of a pixel in the decoded image, which is well known in the art. Correspondingly, in trilinear interpolation, eight property values are used to determine the decoded property value of a single pixel.

The advantage here is that property values present in the cache include not only the target pixel block but also at least one neighboring pixel block of the same superblock. This means that a single memory access is often sufficient to decode a property value even if the chunk of 2×2 property values for bilinear interpolation extends over pixel block borders. Thus, assume that the upper two pixels and property values belong to a first pixel block and the lower two belong to a second neighboring pixel block. Further assume that these two pixel blocks have been handled together as a superblock during compression. In such a case, the single memory fetch of step S51 actually provides a compressed block that allows generation of property values for both the pixel blocks. In the traditional approach of the prior art, two separate memory accesses would have been necessary to first provide the compressed block of the first pixel block and then the compressed block of the second pixel block. Reduction of the memory accesses and bandwidth are thereby achieved by the embodiments.

Furthermore, if later during the decoding it is determined that at least one property value of the neighboring pixel block is needed for the image decoding, the embodiments provide further advantages. The property values for this neighboring pixel block are already present in the cache as fetched in the previous memory access for the other pixel block unless being replaced by more recent data. Therefore no new time-consuming memory access and compressed block decompression is needed to obtain property values of the neighboring pixel block. Usage of property values from pixel blocks lying next to each other in a texture is quite common during image decoding. For instance, first property values from a first pixel block is required in order to draw a pixel of the image and thereafter a next pixel to be drawn needs property values from a second pixel block that is a neighbor to the first pixel block. If both these pixel blocks belong to a same superblock, the property values of the second pixel block come for free and are obtained in the same memory access as the first pixel block.

In an alternative embodiment, the compressed block decompression of step S52 does not necessarily decompress the compressed block to get all the property values for the pixel block and for the at least one neighboring pixel block. In clear contrast, the decompression can be implemented so that only a target property value or a set of target property values are decompressed in a single round of step S52. In such a case, step S54 assigns the at least one target property value to the at least one pixel in the pixel block. Furthermore, if at least one property value is subsequently need from a neighboring pixel block that has been co-compressed together with the pixel block during compression, the compressed block data for the neighboring pixel block is already present on the cache. Step S52 is therefore repeated for the neighboring pixel block but using the same compressed block or a copy of the compressed block fetched in step S51 and being present on the cache. Step S54 then assigns the at least one decompressed property value to at least one pixel in the neighboring pixel block. Pixels of the image are decoded in step S56 based on the decompressed property values from the pixel block and the neighboring pixel block.

If the mode identifier instead signals in step S53 that the compressed block originates from a single pixel block, the method continues to step S55. In this step, the at least one property value obtained from step S52 is assigned to at least one pixel of the single pixel block. Thus, the same amount of data is fetched from the memory in step S51 regardless of whether the compressed block data relates to a superblock or a pixel block. However, in step S54 more property values are obtainable from the compressed data as compared to step S55 since multiple pixel blocks have been co-compressed as a superblock when the mode identifier has the first value but not the second value.

FIG. 9 is a flow diagram illustrating additional preferred steps of the decoding method. The method continues from step S53 in FIG. 8. A next step S60 identifies the at least one other pixel block to which some of the determined property values should be assigned to. This at least one other pixel block is identified based on the memory address of the pixel block determined in step S50 of FIG. 8 and preferably based on the mode identifier. Thus, the mode identifier is used to determine which superblock type, if more than one is possible, that the current compressed block corresponds to. The superblock type further gives information of how many pixel blocks the superblock encompasses, such as four or two, and how the pixel blocks are organized in the image relative each other, such as in two rows and columns, or next to each other on the same row or same column. The memory address of the compressed block is used to determine the position of the pixel block in the superblock. For instance, assume that the mode identifier indicates as 16×16 superblock and that the memory address indicates that the pixel block corresponds to pixel block number 6 of the image having a width corresponding to 12 pixel blocks. In such a case, one determines that the pixel block occupies the upper right corner of the superblock and the other property values that are also obtained from the compressed block should be assigned to pixel blocks number 5, 5+12=17 and 6+12=18 unless Morton ordering or some other locality enhancing ordering of compressed blocks is used. The method then continues to step S54 of FIG. 8.

If the cache is designed to only hold property values of a single pixel block but can include multiple compressed blocks, FIG. 10 illustrates an alternative approach. In such a case, the compressed block fetched from the memory is entered in a first cache location dedicated to the pixel block. The compressed block is decompressed in step S52 and its mode is identified in step S53 of FIG. 8. If it was concluded that the compressed block related to a superblock and not a single pixel block, the method continues to step 70 of FIG. 10. In such a case, the compressed block fetched in step S51 is copied to at least one second cache location dedicated to the at least one other pixel block constituting a part of the same superblock as the pixel block.

The method then continues to step S52, where the compressed block provided in the second cache location is decompressed to get property values of the at least one other pixel block. The property values of all pixel blocks encompassed by the superblock are obtained again.

In an alternative approach, a first memory access fetches the compressed block corresponding to a target pixel block from the memory and stores it in the cache. If later on one or more pixels present in another pixel block is needed, the decoding method preferably investigates whether the compressed block corresponding to this another pixel block is present in the cache. Assume that the compressed block is not on the cache, i.e. a cache miss, the decoding method can then instead look on the cache for the compressed block data relating to a pixel block that potentially has been co-compressed as this another pixel block, i.e. they both belong to a same superblock. In the present case such a compressed block has previously been fetched from the memory and is indeed present on the cache. The mode identifier of the compressed block is then preferably identifier in order to determine whether this identified compressed block is indeed applicable to the another pixel block, i.e. whether the pixel block and the another pixel block belong to the same superblock. In such a case, the compressed data already present on the cache can be used for the another pixel block without any further memory access.

As was discussed for the compression, any fixed rate compression resulting in a compressed block with the pre-defined target bit length can be used. The particular decompression algorithm used in step S52 of FIG. 8 is dictated by the fixed compression algorithm used for generating the compressed block.

For example, ETC2 or DXTC can be used to decompress a compressed block to get 16 property values. If the mode identifier indicates that the compressed block originates from an 8×8 superblock the 4×4 property values are upsampled. This means that each of the 16 property values is assigned to each 2×2 group of non-overlapping pixels in the 8×8 superblock. Other upscaling algorithms known in the art can of course be used instead of this very simple upsamling. For other superblock sizes, the upsampling is only used in one direction, i.e. assigning a property values to both pixels in a 2×1 or a 1×2 group.

In the case of H.264, the first two bits are used to determine whether the compressed block originates from a pixel block or a superblock and in such a case which superblock type. Thereafter the 6-bit qp codeword is used to determine the quantization parameter to use for decompressing the property values contained in the remaining portion of the compressed block.

A superblock may in a particular embodiment have a size in terms of a number of pixels that indeed exceeds N times the number of pixels in a pixel block. In such a case, the area of a superblock may indeed overlap the area of a neighboring pixel block or superblock in the image. For example in FIG. 3F, a pixel block 32 can have 8×8 pixels. In such a case, the superblock 24 could have, for instance 9×16 pixels. This means that the superblock 24 covers the area of the two pixel blocks 34 that it totally encompasses and the area of the image also occupied by the first row of the two pixel blocks 32 present below the superblock 24 in the image. Such overlap of the superblocks may provide a more seamless transition over block boundaries.

In a particular embodiment, overlapping superblocks can be used so that one and the same pixel block can indeed belong to more than one superblock. For instance and with reference to FIG. 3A, a first superblock 20 can contain the pixel blocks 30A to 30D, a second partly overlapping superblock contains the pixel blocks 30B, 32A, 30D, 32C and a third superblock 22 contains the pixel blocks 32A to 32D. In this illustrative example the pixel blocks 30B, 30D, 32A and 32C belong to two superblocks. If the compressed block corresponding to, for instance, pixel block 30C is fetched and decompressed, the decompressed property values of also the neighboring pixel blocks 30A, 30B, 30D belonging to the same superblock 20 could be obtained for free. Correspondingly, if instead the compressed block corresponding to pixel block 30D is fetched and decompressed, property values applicable also for the neighboring pixel blocks 30B, 32A, 32C could be obtained for free as these belong to the same superblock. Overlapping superblocks can be used row by row, column by column or be applied both along the rows and the columns.

Implementation

Figure 11:
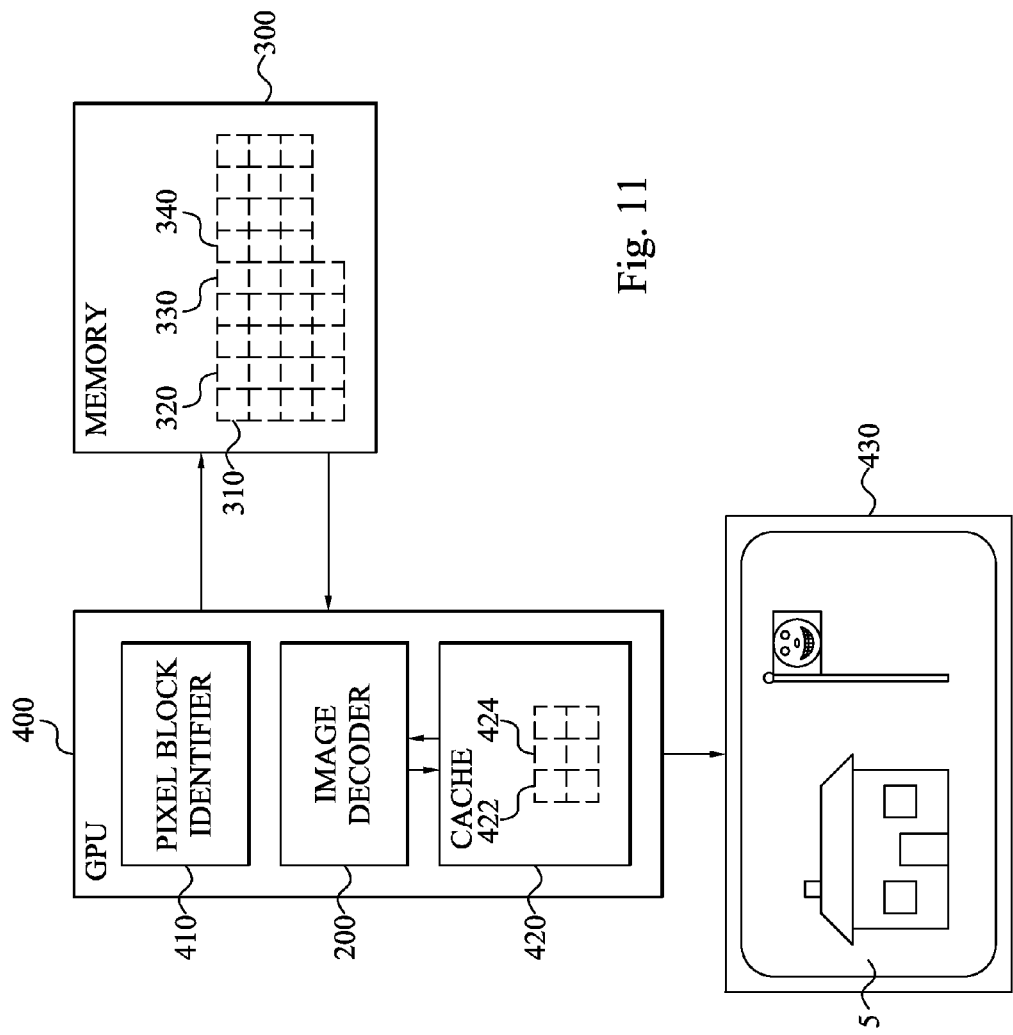
FIG. 11 is a schematic overview of a decoding system comprising an image decoder according to an embodiment.

FIG. 11 schematically illustrates an overview of a decoding system according to an embodiment. The system comprises a RAM 300 having memory locations 310-340 comprising compressed blocks. A GPU 400 is connected to the RAM 300 through a memory bus. The GPU 400 includes functionality or a device 410 for identifying a pixel block, the compressed block of which to fetch from the RAM. This pixel block identifier 410 basically calculates the address of the compressed block in the RAM 300 and sends a memory access request over the bus to the memory 300. The compressed block present in the memory location 310 assigned or dedicated to the pixel block is read from the memory and transferred over the bus to an image decoder 200 of the GPU.

The image decoder 200 comprises or is connected to at least one cache 420 having cache locations or areas 422, 424 for storing compressed blocks and property values. The GPU 400 is typically connected to a display screen 430, on which the decoded image 5 is displayed.

The GPU 400 and its included units 200, 410, 420 may be provided in one or more chips, for instance of a graphics card, video card or a motherboard.

Image Compressor

Figure 12:
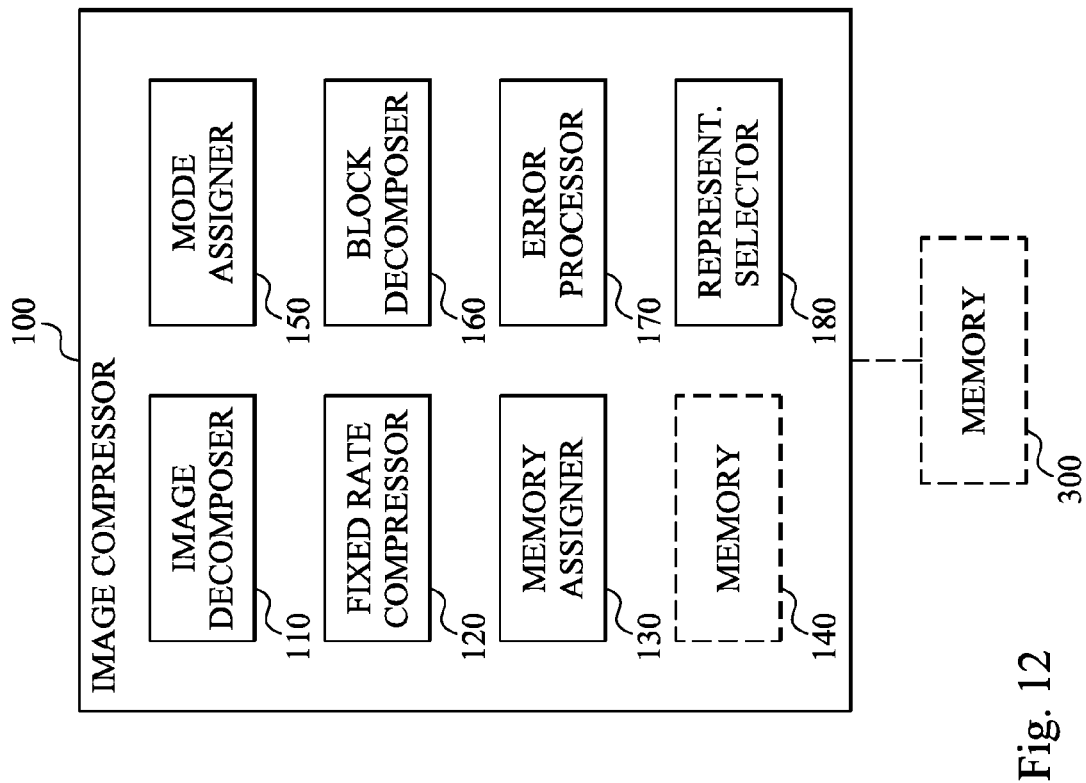
FIG. 12 is a schematic block diagram of an embodiment of an image compressor.

FIG. 12 is a schematic block diagram of an embodiment of an image compressor 100. The image compressor 100 comprises an image decomposer 110 for decomposing an image into multiple superblocks having the same or different sizes. The superblocks each comprise multiple pixel blocks, though this multiple number may be different for different superblocks. However, each pixel block comprises a fixed number of pixels, such as 4×4 or 8×8 pixels.

A fixed rate compressor 120 of the image compressor 100 fixed rate compresses the property values of a superblock to get a compressed block having a target bit length. The fixed rate compressor 120 can compress the property values according to any defined fixed rate compression algorithm as long as the output compressed block has the target bit length.

A memory assigner 130 assigns the compressed block from the fixed rate compressor 120 to memory locations in a memory 140, 300. These memory locations are assigned or dedicated for the multiple pixel blocks encompassed by the superblock. This means that multiple copies of the same compressed block are present in these memory locations, with one compressed block copy in each memory location for the relevant pixel blocks. The memory 140 can be present in the image compressor 100. Alternatively, the memory 300 is externally or even remotely provided. In such a case, the compressed block can be wiredly or wirelessly sent thereto. Alternatively, the memory assigner 130 first enters and stores the compressed block in the multiple memory locations of the internal memory 140. Then, once the whole image or texture has been compressed, the compressed block data is transferred to a remote memory 300, such as in a decoding system.

The image compressor 100 preferably comprises an error processor 170 for determining, in an embodiment, an error metric indicative of representing the property values of the superblock with the multiple copies of the compressed block. A block decomposer 160 may be provided for decomposing the superblock into the multiple individual pixel blocks if the error metric exceeds a maximum error threshold. In such a case, the fixed rate compressor 120 re-compresses the property values, but now each pixel block is handled separately giving rise to multiple, typically different compressed blocks. These compressed blocks 130 are assigned to the memory locations in the memory 140, 300 dedicated for each respective pixel block. Thus, these multiple memory locations will typically contain different compressed block data.

Another embodiment uses the error processor 170 for determining a first error metric indicative of representing the property values of the superblock with the multiple identical copies of the compressed block. The superblock is also decomposed by the block decomposer 160 into its individual multiple pixel blocks. The fixed rate compressor 120 fixed rate compresses each such pixel block to get multiple compressed blocks. The error processor 170 then calculates a second error metric indicative of representing the property values of the superblock with the multiple compressed blocks. In this embodiment, the error metric is preferably the previously mentioned rate-distortion value. If more than one type of superblock is available as was discussed in the foregoing in connection with FIGS. 3B to 3I a portion of the image may be compressed more than two times, thereby determining an error metric for each superblock, combination of superblocks, combination of superblock and pixel blocks, or combination of pixel blocks.

An optional representation selector 180 analyzes the at least two error metrics and selects whether property values should be co-compressed as a superblock or individually compressed as multiple pixel blocks. In the case of rate-distortion metric, the version resulting in the lowest rate-distortion is selected by the representation selector 180.

The image compressor 100 preferably also comprises a mode assigner 150 for assigning a mode identifier to the compressed block. This mode identifier can be a dedicated bit or bit-sequence of the compressed block or at least having dual function, such as also representing color codewords of the compressed block. The mode identifier has a value representing how the property values have been compressed together as a superblock, partly together as multiple superblocks or a superblock and multiple pixel blocks or individually as multiple pixel blocks.

The units 110-130, 150-180 of the image compressor 100 may be provided as software, hardware or a combination thereof. The image compressor 100 may be arranged, for instance, on a central processing unit (CPU) of a texture processing terminal, such as computer, laptop, mobile telephone and other mobile processing units, a game console, etc. If implemented in software, a particular embodiment relates to a computer program product having a set of machine readable instruction which, when installed in a computer or any other data processing terminal having a suitable operating system and memory means, configures the computer or data processing terminal to be operable to perform the image compression and/or image block compression functionality disclosed herein. In the this context, computer should be interpreted broadly to include any processing device, terminal, chip, unit or system having means for effecting the image (block) compressing functionality defined by the computer program product.

Furthermore, the image (block) compressing functionality may be embodied on a computer-readable medium or memory, such as a hard drive of a computer or other image or graphics processing unit, ROM, RAM, etc.

Image Decoder

Figure 13:
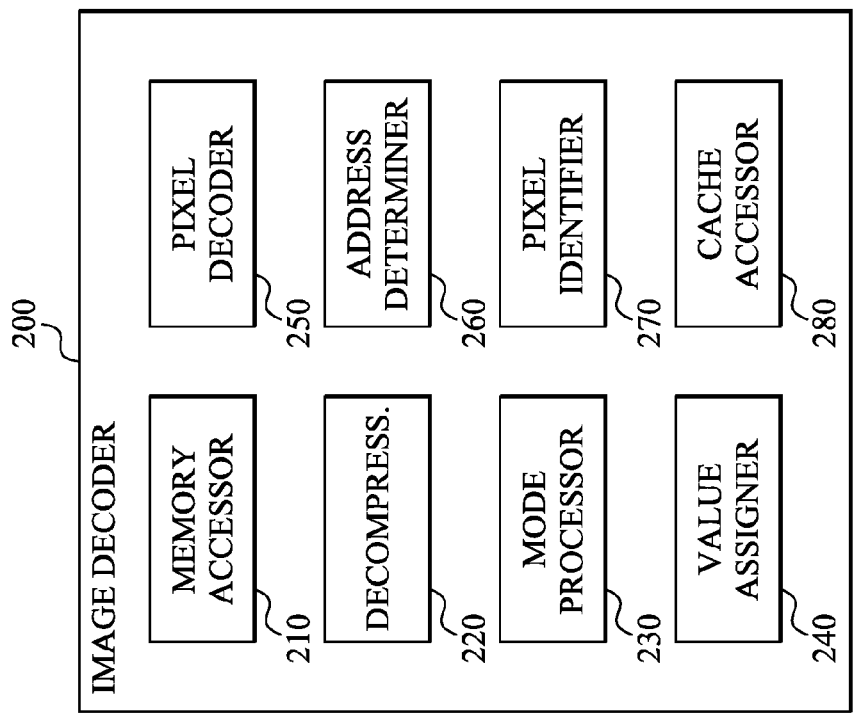
FIG. 13 is a schematic block diagram of an embodiment of an image decoder.

FIG. 13 is a schematic block diagram of an embodiment of an image decoder 200, such as the image decoder illustrated in FIG. 11. The image decoder 200 preferably comprises an address determiner 260 for determining a memory address of a compressed block associated with a target pixel block comprising at least one pixel, the property value of which is needed for decoding a pixel of an image.

The memory address determined by the address determiner 260 is forwarded to a memory accessor 210 implemented in the image decoder 200 for accessing an memory and fetching the compressed block occupying the determined memory address. The memory is typically a RAM accessible to the memory accessor 210 over a memory bus having a limited memory bandwidth.

The read compressed block is brought to a decompressor 220 arranged for decompressing the bit sequence of the compressed block in order to obtain at least one property value. The at least one property value is assigned to at least one pixel of the target pixel block. Correspondingly, if a mode identifier present in the compressed block signals that the compressed block originates from a superblock, at least one property value obtained from the decompression is assigned to at least one neighboring pixel block that was co-compressed during the compression with the target pixel block as a superblock. Alternatively, the decompressor 220 first decompresses at least one property value of the target pixel block. Later, the decompressor 220 needs to decompress at least one property value of a neighboring pixel block. However, the compressed block of that neighboring pixel block is already present in the cache as it is identical to the compressed block data that was fetched by the memory accessor 210 for the previous target pixel block. The decompressor 220 can therefore directly decompress the compressed block and provide the at least one property value for the neighboring pixel block without the need for another memory access.

A pixel decoder 250 is arranged for decoding a pixel of the image based on at least one of the obtained property values. In a preferred implementation and depending on which particular pixel to decode, at least one property value from the target pixel block and at least one pixel from the at least one other pixel block are preferably used, such as in bilinear or trilinear interpolation, to calculate the property value of the pixel in the image.

The image decoder 200 optionally comprises a pixel identifier 270 arranged for identifying the at least one other pixel block based on the memory address of the target pixel block and preferably based on the mode identifier as previously described.

Instead of assigning decompressed property values to pixels of the at least one other pixel block present in the same superblock as the target pixel block, the compressed block accessed by the memory accessor 210 can be temporarily entered in at least two cache locations of a cache available to the image decoder 200. In such a case, one of these cache locations is available for the target pixel block, while the at least one other location is available for the at least one other pixel block. In such a case, later during decoding and if property values from the at least one other pixel block are needed, the compressed block can be fetched from the cache location, unless replaced by new data, without the need for performing a new time-consuming memory access.

The units 210 to 280 of the image decoder 200 may be provided as software, hardware or a combination thereof. The image decoder 200 may be arranged on a GPU of a texture processing terminal, such as computer, laptop, mobile telephone or another mobile processing unit, a game console, etc.

If implemented in software, a particular embodiment relates to a computer program product having a set of machine readable instruction which, when installed in a computer or any other data processing terminal having a suitable operating system and memory means, configures the computer or data processing terminal to be operable to perform the image decoding and/or image block decoding functionality disclosed herein. In the this context, computer should be interpreted broadly to include any processing device, terminal, chip, unit or system having means for effecting the image (block) decoding functionality defined by the computer program product.

Furthermore, the image (block) deconding functionality may be embodied on a computer-readable medium or memory, such as a hard drive of a computer or other image or graphics processing unit, ROM, RAM, etc.

As was mentioned in the foregoing, the image compressor and/or the image decoder may be implemented as software, hardware, or a combination thereof. A computer program product implementing the image compressor and/or the image decoder or a part thereof comprises software or a computer program run on a general purpose or specially adapted computer, processor or microprocessor. The software includes computer program code elements or software code portions. The program may be stored in whole or part, on or in one or more suitable computer readable media or data storage means such as magnetic disks, CD-ROMs or DVD disks, USB memories, hard disks, magneto-optical memory storage means, in RAM or volatile memory, in ROM or flash memory, as firmware, or on a data server. The image compressor and/or the image decoder may be implemented in a computer or any other data processing device as previously mentioned.

Implementation Aspects

In a particular embodiment, assume a decoding system with an 8-bit wide bus that is "double-pumped", meaning that it can produce two 8-bit words, i.e. 16 bits, per clock cycle in burst mode. Usually it takes three clock cycles to set up a memory transfer. This is called the "CAS-cycle" in the art. Thus, in order to set up a 16-bit memory transfer four cycles are needed in this example, three for the CAS, shown by C below, and one for the data transfer, denoted by T16 below:

C Cg C T16

However, a burst of size 4 will also take three CAS cycles, but will only need three more transfers, resulting in

C C C T16 T16 T16 T16 or 7 cycles. Thus for less than twice the number of cycles, four times the data is obtained. Thus in an 8-bit bus system, 64 bits is a reasonable burst size, whereas a 16 bit read is uneconomical. This fits well for many fixed rate compression algorithms, where each pixel block is 64 bits wide.

An embodiment will be compared with a traditional texture compression system herein, which divides the texture into 4×4 pixel blocks and compress each block into 64 bits, using, e.g. ETC2 or DXTC.

The textures are generally stored in Morton order in order to enhance locality, so that bytes close to each other often describe image features near each other. Thus, a texture of size 16×16 pixels have 16 4×4 pixel blocks m00 through m15. If they are arranged in Morton order, they are laid out on the screen as this:

m00 m01 m04 m05
m02 m03 m06 m07
m08 m09 m12 m13
m10 m11 m14 m15 but their compressed counterparts are layed out in memory as m00 m01 m02 m03 m04 m05 m06 . . . m15.

Figures 14, 15:
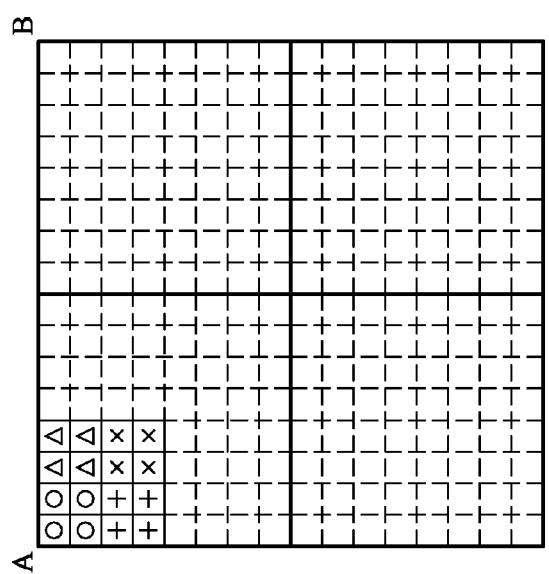
FIG. 14 is a figure illustrating a 16×16 color buffer showing 2×2 pixel chunks.
FIG. 15 is a figure illustrating how pixels in the color buffer from FIG. 14 maps to a texture.

Most system rasterizes an image in chunks of 2×2 pixels, so that image derivatives can be calculated. In FIG. 14, a color buffer of 16×16 pixels is shown. The first 2×2 pixel chunk is marked with four rings, the second with four triangles, followed by plus-signs and crosses. Assume a big quad is to be rendered covering the entire color buffer, and that the pixels marked with rings will be rasterized first, followed by the ones marked with triangles, etc.

The rasterizer now typically executes a fragment shader program for each pixel. It starts by executing the first instruction in the fragment shader program simultaneously for the four fragmens marked with rings. It then continues by executing the second instruction for all four fragments, then the third etc until it comes to a texture lookup. If the desired texels are not in the cache, then a read command to external memory is issued. However, it will take several clocks before the data is available. Hence it will save the state for the four fragments marked with rings and instead start executing instructions for the fragments marked with triangles; executing the first instruction of the shader on all four fragments, then the second etc. until it comes to a texture lookup with a cache miss. It will then go to the plusses, then the crosses etc., all the way until it comes to the last four pixels in the 8×8 block. When this happens, it will revisit the fragments marked with rings. At this time, it is very likely that the memory request has been serviced and the data is available. The rasterizer can now execute the next instruction in the fragment shader until it finishes or comes to another texture lookup with a cache miss, after which it will continue with the fragments marked with triangles etc. When all fragments have executed all shader instructions, the rasterizer ends.

This way, the rasterizer can hide much of the memory latency that comes from the texture accesses.

In a particular implementation, the mode identifier is preferably present at the start or close to the start of the compressed block data. In such a case, once the bits corresponding to the mode identifier has been received and investigated, the decoder can conclude whether the compressed block is applicable to a single pixel block or multiple pixel blocks corresponding to a superblock. In the latter case, the decoder can remove any read command relating to other pixel blocks of the same superblock from the queue. This means that the compressed data for these other pixel blocks does not need to be read from the memory and instead compressed data of other pixel blocks having associated read commands in the queue can be processed. This further speeds up the transfer of compressed data from the memory to the cache.

A traditional architecture would typically use DXTC or ETC2, using 64 bits for each 4×4 pixel block. The 4×4 pixel blocks would normally be stored in Morton order. An example is shown in FIG. 15. The figure illustrates how the quad that was rendered in FIG. 14 is mapped to a texture of size 32×32 pixels. For instance, the upper left corner in FIG. 14 marked with A is mapped to the right-most corner in FIG. 15 also marked with A.

In order to render each pixel in FIG. 15, four texels or pixels in FIG. 14 are read in order to perform a bilinear blend. For example, the four pixels marked with the squares will need texels or pixels present in the compressed block m15. The rasterizer fetches the compressed block m15, which costs 64 bits, i.e. one burst access of seven cycles. Later, when the rasterizer processes the fragments marked with the filled circles, it will need to read compressed block m12, which costs another 64 bits, i.e. another seven cycles. Thus, in order to rasterize both the pixels marked with squared and filled circles, 128 bits and 14 cycles need to be read from external memory according to the prior art.

In a proposed embodiment, four 4×4 pixel blocks will form a superblock. For instance, m12, m13 m14 and m15 will form such a superblock, since they are next to each other in Morton order and make up a square. Hence, when fetching compressed block m15 using a 64 bit burst of seven cycles, compressed blocks m12, m13 and m14 are for free. Thus, when the pixels marked with filled circles are later rasterized, another memory access is not needed if the data is still in the cache. Seven cycles are thereby saved.

In reality, buses are today typically 32-bit wide rather than 8-bit wide, where a four-cycle burst fetches 256 bits instead of 64 bits. This means that a traditional fixed rate system would rather read four 4×4 pixel blocks or an 8×8 pixel block at a time to have economical burst behavior. This does not change the analysis, since the proposed system would instead have 8×8 pixels for the pixel blocks of 256 bits and, for instance, 16×16 super blocks of 256 bits.

Figure 16:
FIG. 16 is a comparison of an embodiment of the invention presented by the image on the left and prior art presented by the image on the right.

The image Lena was compressed according to prior art ETC2 by dividing the image into 8×8 superblocks and dividing the 8×8 superblocks further to four 4×4 pixel blocks each and encode every 4×4 pixel blocks with ETC2. The result following decompression is illustrated in the right of FIG. 16.

In addition, each 8×8 superblock was subsampled into a 4×4 pixel block that was encoded with ETC2. The SSD was calculated for each superblock and the superblock with the worst quality was then instead compressed according to the prior art, i.e. each of the four pixel blocks of the superblock is compressed individually. This process was repeated until 50% of the image was handled with superblocks and the remaining half had individual pixel blocks. The result following decompression is illustrated in the left of FIG. 16.

The bit rate according to the prior art is 4 bits per pixel (bpp). In the example of the invention 65 bits were spent per superblock and pixel block by having a mode identifier of one bit added to the 64-bit sequence from the ETC2 compressor. The bit rate therefore became $$\frac{65}{16} \times 0.5 + \frac{65}{64} \times 0.5 \approx 2.54$$

bpp. As is seen in FIG. 16, the quality is still very good but the bit rate is almost halved.

The decrease in bit rate is 36.5% which is dramatic. However, the bandwidth savings will only be this great if all texels that are transferred over the bus are also used. Since we will sometimes use superblocks, this is likely not going to be the case. For instance, assume that for half of the times when a superblock is read, reading a pixel block is avoided. Then a bandwidth reduction of 25% is achieved, which is very significant. Even lower reductions of, say, 10% would still be regarded as significant.

Figure 17:
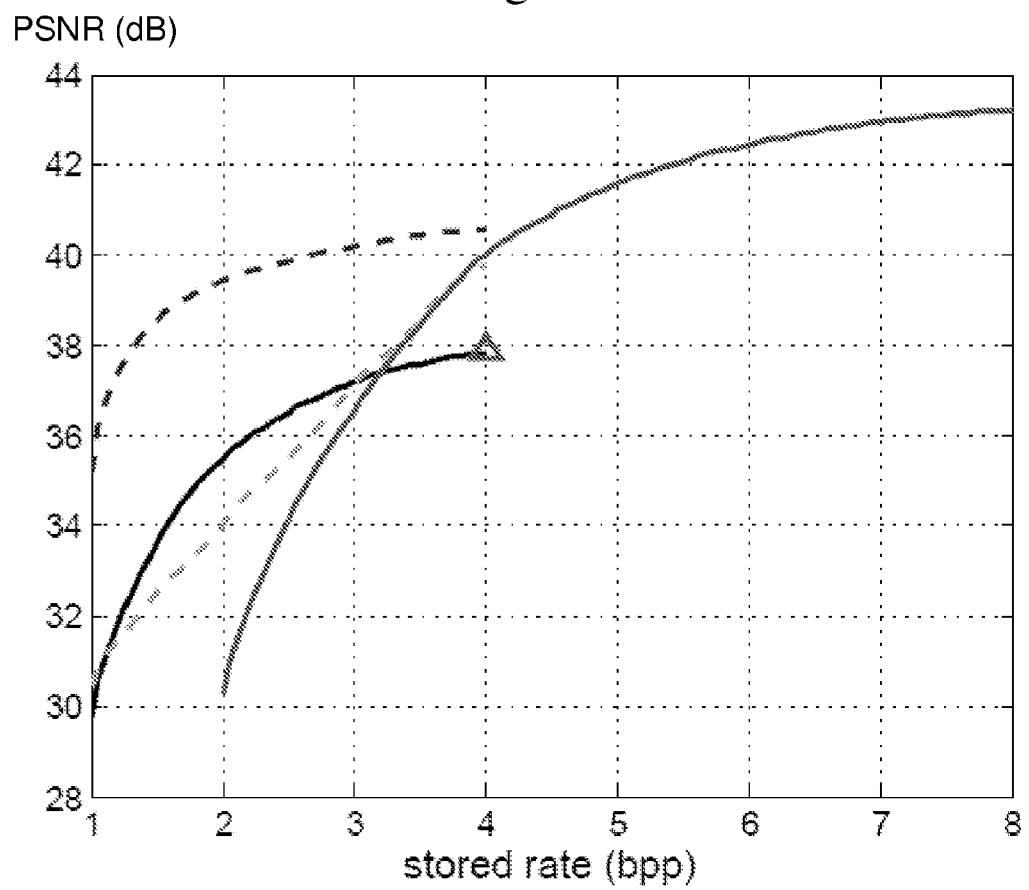
FIG. 17 is a diagram plotting PSNR against rate.

In a further implementation example, a set of 64 textures of mainly photographs and game textures, but also a small number of computer generated images have been compressed. The fixed rate compressor was The Compressonator 1.50.1731 for DXT1-565 compression and then an exhaustive search in the green component was done in order to get to DXT1-555. Thus, one bit of each of the color codewords was used as mode identifier as previously described. By varying λ, each image was compressed to a large number of rates ranging from 1 bpp, i.e. using only superblocks of 8×8 pixels as in FIG. 3C to 4 bpp. The quality in terms of Peak Signal-to-Noise Ratio (PSNR) was then calculated using $$PSNR = 10\log\left(\frac{3wh255^2}{sse}\right),$$

where sse is the summed squared difference over the image and where w and h are the width and height of the texture. In FIG. 17 the two dashed lines plot the quality for two different textures against the rate. As can be seen, they can be rather different; for the upper dashed curve, it is possible to reduce the bit rate quite a lot before losing much quality, whereas the texture represented by the lower dashed curve loses quality quickly as the rate goes down. By averaging sse over all 64 textures, we end up with the shorter solid black curve. By comparison, regular fixed-rate DXT1-565 according to prior art is represented by the triangle in the diagram at 4 bpp and 37.9 dB. Note that its PSNR is slightly higher than the end of solid black curve which represent an embodiment of the proposed system. The reason for this is the two bits sacrificed in the green component in order to have space for the mode identifier. It is also clear from the black curve that on average, the proposed system allows the trading of a small amount of quality against a rather large reduction in bandwidth.

In another implementation aspect, a codec having higher bit rate than the fixed-rate DXT1-565 is used to improve the quality further. The implementation example provides an 128 bit/block codec (8 bpp) to be used for the 4×4 pixel blocks: The first 64 bits represent a DXT1-555 block, again with colors stored as RGB555 to make room for the two mode identifier bits. The second 64 bits are decoded just as the alpha component in DXT5; but instead of containing an alpha value they contain an intensity modifier value for each pixel. For instance, if the RGB value decoded from the first 64 bits is (222; 132; 16), and the intensity modifier value for the corresponding pixel is 178, then the resulting color is clamp((222; 132; 16)+178; 178; 178)−(128; 128; 128))=(255; 182; 66) where clamp(·) makes sure the resulting values are in the interval [0; 255], and where the constant 128 makes it possible to have negative intensity modifiers. This codec can be seen as a simplified version of the $YC_0C_g$-DXT compression presented in [7]. Correcting the DXT1-555-decompressed values in this way increases quality substantially, but at the cost of doubling the bit rate. By moving each color value towards its projection on the plane R+G+B−384=0 prior to DXT1-555 compression, quality can be further increased for some blocks.

This sometimes makes it easier for the DXT1-555-part to encode the chrominance, whereas the intensity error thus introduced can be easily corrected by the intensity modifier. An individual color value can be moved all the way to the R+G+B−384=0 plane or be stopped earlier if some values go outside the [0; 255] range. Each pixel block was encoded both with and without projection, the compression resulting in the best quality was then kept. Note that the decoder does not need to know whether projection was used during compression or not; hence no bits are needed to signal this to the decoder. In the present example, this modified 8 bpp codec is denoted "modlum", since it works by modifying the luminance of the pixels.

If applied as a fixed rate codec, this modified 8 bpp codec increases the PSNR with 5.4 dB over fixed-rate DXT1-565 measured over the 64 images, but at the cost of doubling the bit rate. In an embodiment of the proposed system, this high rate is, however, only used for the most complicated pixel block—the modlum codec will be used as is only for the 4×4 pixel blocks. The 8×8 superblocks will also be encoded by the codec, but they will be downscaled to 4×4 pixels prior to compression, and upscaled bilinearly to 8×8 again after decompression.

The 4×8 and 8×4 superblocks will instead consist of two DXT1-555 pixel blocks side-by-side (or on top of each other), each encoding 4×4 pixels using 64 bits. Hence pixel blocks and superblocks of all sizes use 128 bits, and the proposed architecture can be applied. Herein this 8 bpp version of the system is called "modlum-variable", since pixel blocks and the largest superblocks are based on the modlum codec. The longer solid curve in FIG. 17 shows the rate distortion behavior for the modlum-variable configuration averaged over the 64 test textures. As we can see, the curve is about 2.1 dB higher than regular DXT1-565 at the rate of 4 bpp. This increased quality comes from the fact that it is possible to save bits in simple areas by using the 8×8 blocks that uses 2 bpp, and use those bits in complicated areas using 4×4 blocks that uses 8 bpp. Note however that the textures for "modlum-variable" take up twice the space in memory.

In order to evaluate if the proposed system embodiment really can increase quality for the same bandwidth, and if so by how much, a software-based simulation framework has been implemented, which can rasterize different scenes using different texture compression methods, and report the texture bandwidth consumed. The simulation framework only registers actual bandwidth transfers; latencies are not modeled. Triangles are rasterized in Morton order for spatial coherence. The texture cache size is set to 2048 bytes, which means that the cache can hold 2048×8/64=256, compressed pixel blocks or superblocks for the fixed rate DXT1 system, and 2048×8=128=128 pixel blocks or superblocks for the proposed 8 bpp system.

Figure 18:
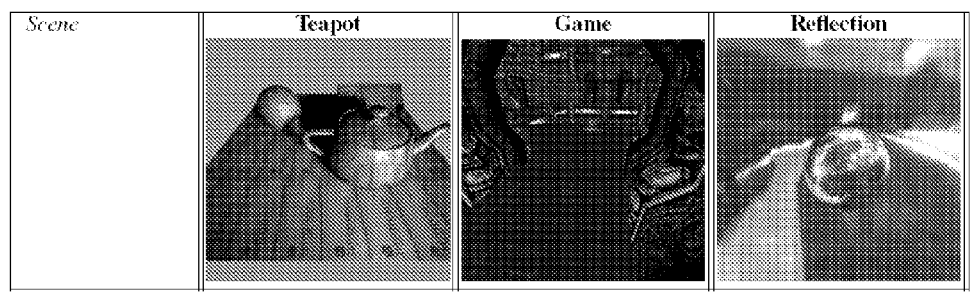
FIG. 18 is an illustration of test scenes processed according to an embodiment.
Figure 19:
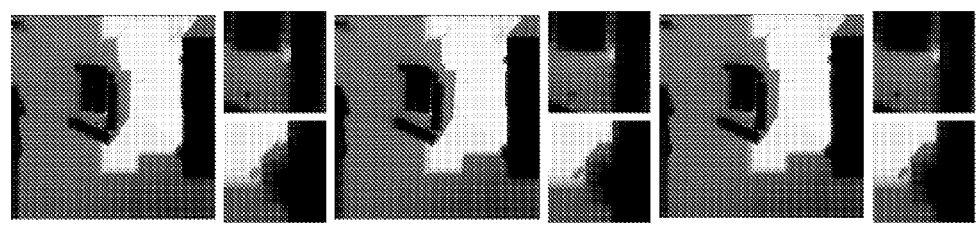
FIG. 19 illustrates bandwidth results when rendering a scene, left representing prior art DXTC, middle representing an embodiment and right representing a second embodiment.

The bandwidth consumption was simulated using the teapot test scene depicted in FIG. 18. The scene is created to be an average scene, but where only one texture is used for all surfaces. The texture used in the test is part of a lightmap texture from the game "Mirror's Edge", shown in FIG. 19. The bandwidth consumption of the reference system running regular DXT1-565 using 4×4 pixel blocks of 64 bits was first measured. The resolution of the rendered image was set so that the highest resolution mipmap was accessed at least sometimes, in this case 1024×1024. The bandwidth measured for the texture accesses was 1:27 MB for the DXT1-565 reference system, and the PSNR score of the highest resolution mipmap level, leftmost image in FIG. 19, was 46.7 dB. As is well known in the art of texture graphics, mipmaps are pre-calculated, optimized collections of images that accompany a main texture and are intended to increase rendering speed and reduce aliasing artifacts.

The texture was then compressed with the proposed system, using the "modlum-variable"-configuration, where each macroblock varied in bit rate between 2 bpp and 8 bpp. This yielded a PSNR score of 52.3 dB, an increase of 5.6 dB, at a bandwidth of 0.90 MB—substantially lower. Visual quality is also very good, since the rate distortion optimization automatically redistributes bits to more complicated areas.

Finally a comparison against between a fixed rate of 8 bpp and the modlum-fixed codec was conducted. Here the bandwidth for texture accesses was 2.735 MB, i.e., almost a factor of three higher than for the proposed system, but at a similar PSNR level of 53.8 dB.

The previous experiment was conducted under the assumption that a single block of 128 bits can be efficiently transferred from the memory. In reality, the bus width and the burst behavior of a system will set a limit on how small a memory transfer can be while still using the bus efficiently. A memory bus of 64 bits that is double-pumped is assumed, thus allowing 128 bits of data transferred per clock during burst mode. A CAS latency of 3 cycles is also assumed, and that a burst cycle must be at least four cycles to be efficient, giving 512 bits for such a burst access. This means that a texture block should be 512 bits rather than the 128 bits used for the "modlum-variable" solution. Using a pixel block size of 8×8 and superblock sizes of 16×8, 8×16 and 16×16 instead would yield compressed sizes of 512 bits.

Assuming these new pixel block and superblock sizes, the previous example will be revisited, were a bilinear patch on the border between two pixel blocks are read. It is now assumed that the reference system uses 8×8 pixel blocks of 512 bits each. Two texels or pixels of the patch are situated in pixel block 30A in FIG. 3B and two in pixel block 30B—the reference system will thus have to read both pixel blocks 30A, 30B. To start that data transfer will take three CAS cycles followed by four data transfer cycles for pixel block 30A carrying 128 bits each. It is assumed that reading pixel block 30B, bits 512-1023, can be started early by requesting pixel block 30B in cycle 4, effectively hiding the CAS cycles for pixel block 30B. Thus, the entire transfer takes 11 cycles, or 8 assuming that CAS cycles always can be hidden.

The proposed system embodiment also starts by reading the first 512 bits. However, the system has already at clock 3 obtained the first 128 bits, including the two mode identifier bits. From this data the system can determine that this is a 16×8 superblock covering also the texels of interest in the neighboring 8×8 pixels. Thus the bits 512 through 1023 need never be requested, and the system thus saves four 128-bit-wide bus cycles.

From this analysis it is clear, that if the largest superblock size is changed from 8×8 to 16×16, the system has a good chance of avoiding unnecessary memory accesses. One way to increase the superblock size could be use the same building blocks from the two previous embodiments; for instance for the 16×16 superblock, four 8×8 upsampled modlum pixel blocks could be used. However, that would be inefficient, since all the 8×8 pixel blocks would be independent. That would make it impossible to share information between the four pixel blocks, or predict across pixel block boundaries. To avoid such inefficiencies, a third set of codecs for 8×8, 8×16, 16×8 and 16×16 pixels based on the H.264 codec used for video compression can be used. Since the smallest possible image size in H.264 is 16×16 pixels, modifications of the reference implementation of the H.264 codec [8] have been made so that it can compress images down to 8×8 pixels. The header information, which is the same for every pixel block and superblock, is omitted. To compress a pixel block or superblock to a fixed rate, it is compressed several times with different settings of the quantization parameter qp, a value between 0 and 51 which will affect the quality and number of bits. The largest bit size that is still smaller than the fixed rate is then selected. The decoder must know which qp was used to compress the pixel block or superblock, and therefore the qp is stored in the compressed block using 6 bits. For the proposed system, 2 bits will be the mode identifier, 6 bits will be the qp and 128 bits will be reserved for alpha, leaving 376 bits for the H.264 data. A fixed rate reference system will not need the two mode identifier bits and thus fit 378 bits of H.264 data.

The first test of the H.264-based encoder is to see if substantial gains in bandwidth can be made for a texture that should be rather easy for the system to exploit. To do so, the bandwidth consumption of the texture shown in FIG. 20 has been simulated. For this, the teapot scene was used, with all surfaces using this texture. The bandwidth consumption was first measured for a fixed rate H.264 reference system using 8×8 pixel blocks. To show quality differences more clearly, the bit rate was lowered to 4 bpp, which meant that a single 8×8 pixel block was stored using 256 bits. The bandwidth measured for texture accesses was 2.298 MB for the reference system.

Figure 20:
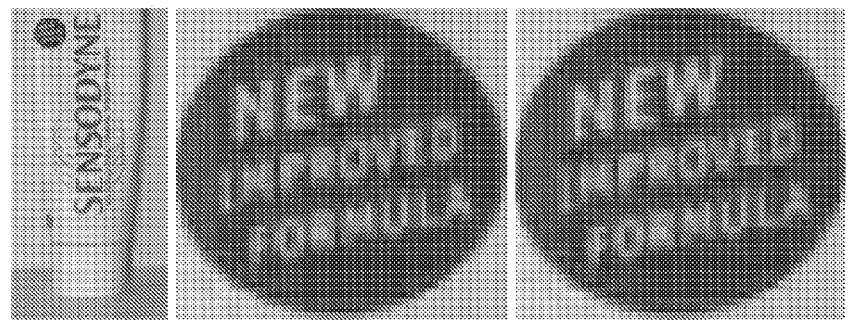
FIG. 20 illustrates a test image with magnifications following a prior art system in the middle and according to an embodiment to the right.

The texture was then compressed using the proposed system embodiment, using the same size of the cache, and where each macroblock varied in bit rate. This yielded a bandwidth figure of 0.913 MB, which is 62% lower. Still, very good quality is preserved in important areas as can be seen in FIG. 20, since the rate distortion optimization automatically distributes bits to the more complicated areas. Since the H.264 codec can operate at different bit rates, the number of bits per pixel block in the 8×8 fixed rate codec can be lowered to match exactly the bandwidth of the proposed system. Since the bandwidth is so low, it turns out to be better to use a fixed block size of 16×16, but even so, the measured PSNR is almost a full dB lower than for the proposed system, for the highest resolution image. A screen shot from the teapot scene along with the measurement data can be found in FIG. 18. Performance figures relating to the screen shots in FIG. 18 are presented in Table I below.

TABLE I performance figures

| Scene | Teapot | Game | Reflection 540 | |
|---|---|---|---|---|
| # triangles | 2152 | 4939 | normal map | random |
| Fixed rate 8 × 8 | 2.410 MB | 2.46 MB | 0.56 MB | 1.63 MB |
| Proposed system | 0.928 MB | 1.49 MB | 0.32 MB | 1.54 MB |
| BW savings | 61.5% | 39.2% | 32.4% | 5.5% |

Figure 21:
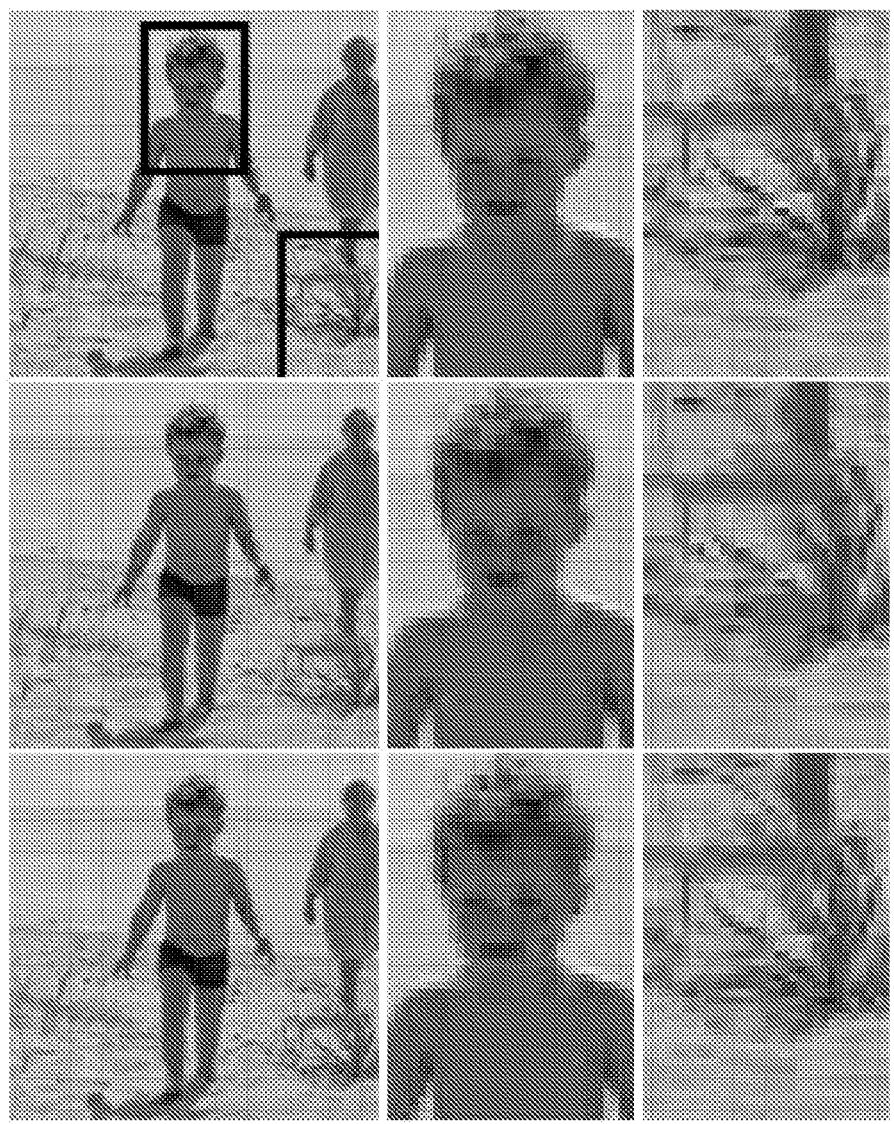
FIG. 21 illustrates subjective quality by increasing quality in important areas and decreasing it in relatively unimportant area with top row illustrating original image, middle row according to an embodiment and bottom row according to prior art.

The ability to steer bandwidth consumption, and thus quality, to different areas in the texture can be useful even if the average quality is equidistributed, as the next experiment will show. Here, the proposed system embodiment is compared to a fixed rate system of 16×16 sized pixel blocks. As illustrated in FIG. 21, the 16×16 fixed rate system actually outperforms the proposed system in terms of average PSNR. Still, the possibility to steer quality in the texture to the face and body area of the child in the foreground means that the quality of the proposed system may very well be perceived to be better, subjectively. The zoom-ins in FIG. 21 shows the face area, which is favored in the proposed system, and the sand area, which is unfavored.

For some textures, all areas are equally hard to code, and equally important subjectively. In this case, a fixed rate coder is optimal; no bits are wasted on directing where to increase the quality. However, even in this case the proposed system can be beneficial—namely by being able to compress different textures with different bit rates. The next experiment illustrates this: The game scene contains 32 textures. We compressed these with the 8×8 fixed rate reference system, using 384 bits per pixel block, assuming that the rest 128 bits are reserved for alpha. The PSNR-score for each texture was then calculated, and the median score, 51.9 dB, was noted. The scene was now rendered, and the texture bandwidth measured 2.46 MB.

For the proposed system, all textures was compressed with the median PSNR score rounded up to 52 dB as the target quality. Half of the textures would thus be encoded with maximum bit rate, i.e. according to FIG. 3B, and half would be lowering quality, aiming at the median PSNR-score. This way, only the easiest-to-compress half of the textures were changed. When rendering, the texture bandwidth for the proposed system was 1.49 MB, a reduction of 39.2%. This is a rather big reduction from changing only half of the textures. In fact, this was partly due to the fact that the floor texture enjoyed a type of cache-boosting effect: Larger superblocks, while taking up the same amount of bits in the cache, cover more pixels, which means that the effective size of the cache increases for such superblocks. The floor texture happened to be easy to encode and its superblocks were thus often of type illustrated in FIG. 3C. Hence an entire mipmap level could fit into the cache a full LOD level earlier than for the reference system, reducing bandwidth consumption greatly.

Figure 22:
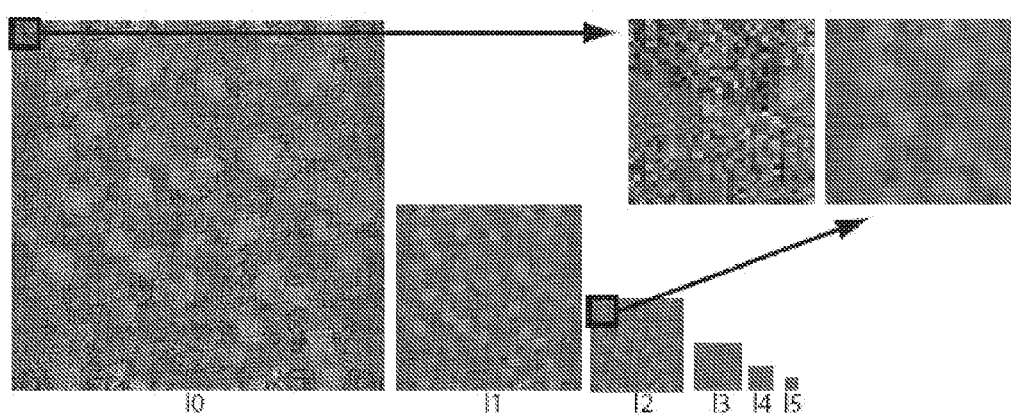
FIG. 22 illustrates a homogenous texture with different levels compressing complexity.

Furthermore, the proposed system can vary bit rates between mipmap levels, which can be beneficial, since some mipmap levels may be much harder to compress than other. A good example is textures with high-frequency content, such as the one from the game scene shown in FIG. 22, which was compressed with a fixed rate. At the highest resolution mipmap level, the texture is noisy and hard to compress—PSNR is 38.18 dB. Two mipmap levels away, the image is much smoother and easier to compress—PSNR is now 47.08 dB. It is clear that it is possible to gain bandwidth without losing much quality in this mipmap level, whereas this is not the case in the highest resolution mipmap level.

The last experiment was done to stress-test the system; the main benefit of the proposed system embodiment is that it reads more pixels than it needs at no extra cost; if these pixels are never used, bandwidth reduction should be small. The reflection scene is created to test this case; it depicts a sphere with a noisy reflection map. Reflections off the sphere should therefore result in texture lookups far from each other, and hence our system has little to gain. However, even with perfectly incoherent lookups, the gain is not zero; this is due to the fact that bilinear patches are read from the texture, rather than individual texels. Hence, when the bilinear patch is placed on an 8×8 border in the fixed rate reference system, it is sometimes completely inside a superblock in the proposed system, and one pixel block of bandwidth is saved. In this scene, a full rate of $f_r$=8 bpp was used. When compressing the environment map, the rate distortion was set to a target $t_r$=3:8 bpp, so the maximum possible savings would be 1-3.8/8=52.5%. In this scene only the texture bandwidth from the sphere itself was measured, where texture lookups should be maximally incoherent. The scene was rendered to a resolution of 320×320 pixels, which resulted in at least some texture accesses of the highest resolution mipmap. The measured result was better than expected; bandwidth requirements went down from 0.56 MB to 0.38 MB, a reduction of 32%. Thus the texture coherence is still quite high in this image, so to really stress-test the method, we switched to completely random normals on the sphere. Even with random normals, the texturing bandwidth of the proposed method was 5.5% lower than for the reference system.

It will be understood by a person skilled in the art that various modifications and changes may be made to the present invention without departure from the scope thereof, which is defined by the appended claims.

REFERENCES

[1] U.S. Pat. No. 5,956,431

[2] Ström and Möller, "iPACKMAN: High-Quality, Low-Complexity Texture Compression for Mobile Phones", Graphics Hardware, 2005, ACM Press, pp. 63-70

[3] Inada and McCool, "Compressed Lossless Texture Representation and Caching", Graphics Hardware, 2006

[4] Ström and Pettersson, "ETC2: Texture Compression using Invalid Combinations", Graphics Hardware, 2007, ACM Press, pp. 49-54

[5] WO 2006/006915

[6] ITU-T, H.264: Advanced video coding for generic audiovisual services, November 2007

[7] van Waveren and Castano, "Real-Time YCoCg-DXT Compression" nVidia Report, 2007, available at http://developer.nvidia.com/object/real-time-ycocq-dxt-compression.htm

[8] Süehring, J M Software H.264/AVC, http://iphome.hhi.de/suehring/tml/

The invention claimed is:

1. A method of compressing an image comprising multiple pixels having property values, said method comprising the steps of:
decomposing said image into multiple superblocks, where a superblock encompasses N pixel blocks (30A-30D, 32A-32D) of multiple pixels and N is an integer equal to or larger than two;
for at least a superblock of said multiple superblocks:
fixed rate compressing property values of said superblock to get a compressed block having a target bit length;
assigning said compressed block to memory locations assigned for said N pixel blocks (30A-30D) encompassed by said superblock to get N copies of said compressed block in said memory locations, wherein said N copies of said compressed block collectively constitute a compressed representation of said superblock.

2. The method of claim 1, further comprising assigning, to said compressed block, a mode identifier having a first value indicating that said compressed block is applicable to N pixel blocks (30A-30D).

3. The method of claim 1, further comprising, for at least another superblock of said multiple superblocks:
decomposing said another superblock into N pixel blocks (32A-32D) of multiple pixels;
for each pixel block (32A-32D) of said N pixel blocks (32A-32D) of said another superblock:
fixed rate compressing property values of a pixel block (32A-32D) to get a compressed block having said target bit length;
assigning said compressed block to a memory location assigned for said pixel block (32A-32D), wherein said N compressed blocks in said memory locations collectively constitute said compressed representation of said another superblock.

4. The method of claim 1, further comprising the steps of:
determining an error metric indicative of representing said property values of said superblock with said N copies of said compressed block;
if said error metric exceeds a maximum error threshold:
decomposing said superblock into said N pixel blocks (30A-30D) of multiple pixels;
for each pixel block (30A-30D) of said N pixel blocks (30A-30D) of said superblock:
fixed rate compressing property values of a pixel block (30A-30D) to get a compressed block having said target bit length;
assigning said compressed block to a memory location assigned for said pixel block (30A-30D), wherein said N compressed blocks in said memory locations collectively constitute said compressed representation of said superblock.

5. The method of claim 3, further comprising assigning, to each compressed block of said N compressed blocks, a mode identifier having a second value indicating that said compressed block is applicable to one pixel block (30A-30D).

6. The method of claim 1, further comprising the steps of:
determining a first error metric indicative of representing said property values of said superblock with said N copies of said compressed block;
decomposing said superblock into said N pixel blocks (30A-30D) of multiple pixels;
for each pixel block (30A-30D) of said N pixel blocks (30A-30D) of said superblock:
fixed rate compressing property values of a pixel block (30A-30D) to get a compressed block having said target bit length;
assigning said compressed block to a memory location assigned for said pixel block (30A-30D), wherein said N compressed blocks in said memory locations collectively constitute said compressed representation of said superblock;
determining a second error metric indicative of representing said property values of said superblock with said N compressed blocks; and
selecting said compressed representation to be one of said N copies of said compressed block and said N compressed blocks based on said first error metric and said second error metric.

7. A method of decoding an image represented by multiple compressed blocks stored in a memory, said method comprising the steps of:
fetching a compressed block from said memory;
decompressing said compressed block to get multiple property values;
assigning said multiple property values to a pixel block (30A) and at least one other pixel block (30B-30D) being encompassed together with said pixel block (30A) in a superblock;
decoding said image based on at least one property value of said pixel block (30A) and at least one property value of said other pixel block (30B-30D).

8. The method of claim 7, wherein
said decompressing step comprises decompressing said compressed block to get said multiple property values and a mode identifier, and
said assigning step comprises assigning, if said mode identifier has a first value, said multiple property values to said pixel block (30A) and said at least one other pixel block (30B-30D) being encompassed together with said pixel block (30A) in said superblock.

9. The method of claim 7, further comprising the steps of:
determining an address assigned to said pixel block (30A) in said memory
identifying said at least one other pixel block (30B-30D) based on said address.

10. The method of claim 7, further comprising the steps of:
entering said compressed block in a cache location in a cache assigned to said pixel block (30A); and
copying said compressed block to a cache location in said cache assigned to said at least one other pixel block (30B-30D).

11. An image compressor for compressing an image comprising multiple pixels having property values, said image compressor comprises:
an image decomposer for decomposing said image into multiple superblocks, where a superblock encompasses N pixel blocks (30A-30D, 32A-32D) of multiple pixels and N is an integer equal to or larger than two;
a fixed rate compressor for fixed rate compressing, for at least a superblock of said multiple superblocks, property values of said superblock to get a compressed block having a target bit length; and
a memory assigner for assigning said compressed block to memory locations of a memory and being assigned for said N pixel blocks (30A-30D) encompassed by said superblock to get N copies of said compressed block in said memory locations, wherein said N copies of said compressed block collectively constitute a compressed representation of said superblock.

12. The image compressor of claim 11, further comprising a mode assigner for assigning, to said compressed block, a mode identifier having a first value indicating that said compressed block is applicable to N pixel blocks (30A-30D).

13. The image compressor of claim 11, further comprising a block decomposer for decomposing, for at least another superblock of said multiple superblocks, said another superblock into N pixel blocks (32A-32D) of multiple pixels, wherein
said fixed rate compressor is arranged for fixed rate compressing, for each pixel block (32A-32D) of said N pixel blocks (32A-32D) of said another superblock, property values of a pixel block (32A-32D) to get a compressed block having said target bit length;
said memory assigner is arranged for assigning said compressed block to a memory location of said memory and being assigned for said pixel block (32A-32D), wherein said N compressed blocks in said memory locations collectively constitute said compressed representation of said another superblock.

14. The image compressor of claim 11, further comprising:
an error processor for determining an error metric indicative of representing said property values of said superblock with said compressed representation; and
a block decomposer arranged for decomposing said superblock into said N pixel blocks (30A-30D) if said error metric exceeds a maximum error threshold, wherein
said fixed rate compressor is arranged for fixed rate compressing, for each pixel block (30A-30D) of said N pixel blocks (30A-30D) of said superblock and if said error metric exceeds a maximum error threshold, property values of a pixel block (30A-30D) to get a compressed block having said target bit length;
said memory assigner is arranged for assigning, if said error metric exceeds a maximum error threshold, said compressed block to a memory location of said memory and being assigned for said pixel block (30A-30d), wherein said N compressed blocks in said memory locations collectively constitute said compressed representation of said superblock.

15. The image compressor of claim 13, further comprising a mode assigner for assigning, to each compressed block of said N compressed blocks, a mode identifier having a second value indicating that said compressed block is applicable to one pixel block (30A-30D).

16. The image compressor of claim 11, further comprising:
a block decomposer arranged for decomposing said superblock into said N pixel blocks (30A-30D), wherein
said fixed rate compressor is arranged for fixed rate compressing, for each pixel block (30A-30D) of said N pixel blocks (30A-30D) of said superblock, property values of a pixel block (30A-30D) to get a compressed block having said target bit length;
said memory assigner is arranged for assigning said compressed block to a memory location of said memory and being assigned for said pixel block (30A-30D), wherein said N compressed blocks in said memory locations collectively constitute said compressed representation of said superblock, said image compressor further comprising:
an error processor for determining a first error metric indicative of representing said property values of said superblock with said N copies of said compressed block and determining a second error metric indicative of representing said property values of said superblock with said N compressed blocks; and
a representation selector for selecting said compressed representation to be one of said N copies of said compressed block and said N compressed blocks based on said first error metric and said second error metric.

17. An image decoder for decoding an image, said image decoder comprises:
a memory accessor for fetching a compressed block from a memory storing multiple compressed blocks representing said image;
a decompressor for decompressing said compressed block to get multiple property values;
a value assigner for assigning said multiple property values to a pixel block (30A) and at least one other pixel block (30B-30D) being encompassed together with said pixel block (30A) in a superblock;
a pixel decoder for decoding said image based on at least one property value of said pixel block (30A) and at least one property value of said other pixel block (30B-30D).

18. The image decoder of claim 17, wherein said decompressor is arranged for decompressing said compressed block to get said multiple property values and a mode identifier, and said value assigner is arranged for assigning, if said mode identifier has a first value, said multiple property values to said pixel block (30A) and said at least one other pixel block (30B-30D) being encompassed together with said pixel block (30A) in said superblock.

19. The image decoder of claim 17, further comprising:
an address determiner for determining an address assigned to said pixel block (30A) in said memory; and a pixel identifier for identifying said at least one other pixel block (30B-30D) based on said address.

20. The image decoder of claim 17, further comprising a cache accessor for entering said compressed block in a cache location in a cache assigned to said pixel block (30A) and copying said compressed block to a cache location in said cache assigned to said at least one other pixel block (30B-30D).

* * * * *